(12) United States Patent
Crozier et al.

(10) Patent No.: US 12,525,101 B1
(45) Date of Patent: Jan. 13, 2026

(54) SMART BAGGING STATION WITH HALO SENSOR ARRAY

(71) Applicant: Walmart Apollo, LLC, Bentonville, AR (US)

(72) Inventors: Ryan Paul Crozier, Bentonville, AR (US); Christian Godwin, Bentonville, AR (US); Brendan Wilson, Springdale, AR (US); Jathen Brown, Gravette, AR (US); John Rollins, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/040,330

(22) Filed: Jan. 29, 2025

(51) Int. Cl.
*G07G 1/00* (2006.01)
*G06V 10/70* (2022.01)
*G07G 1/01* (2006.01)

(52) U.S. Cl.
CPC .......... *G07G 1/009* (2013.01); *G06V 10/70* (2022.01); *G07G 1/0072* (2013.01); *G07G 1/01* (2013.01)

(58) Field of Classification Search
CPC ........ G07G 1/009; G07G 1/0072; G07G 1/01; G06V 10/70
USPC ....................................................... 235/383
See application file for complete search history.

(56) References Cited

U.S. PATENT DOCUMENTS

| | | | |
|---|---|---|---|
| 2020/0342208 A1* | 10/2020 | Srivastava | G06T 7/194 |
| 2020/0402130 A1 | 12/2020 | Landers, Jr. et al. | |
| 2024/0095709 A1 | 3/2024 | Srivastava et al. | |
| 2024/0242503 A1* | 7/2024 | Musiani | G07G 3/003 |

FOREIGN PATENT DOCUMENTS

CN     110866544 A     3/2020

OTHER PUBLICATIONS

Unknown, "Nordic ID Self-Checkout", Nordic ID, 2021, https://www.nordicid.com/solutions/nordic-id-selfcheckout/, captured Oct. 11, 2024, 4 pages.

* cited by examiner

*Primary Examiner* — Daniel A Hess
(74) *Attorney, Agent, or Firm* — Foley IP Law, PLLC

(57) ABSTRACT

Examples provide a smart bagging station including a halo array of sensor devices generating sensor data associated with a detection zone surrounding the smart bagging station. The smart bagging station includes barcode scanners in a curved arrangement within a recessed sensor device housing located behind a bagging device. As a user places an item into a bag, the item is automatically scanned by the barcode scanners without re-orienting the item or passing it across a scanning sensor. Other sensor devices, including RFID tag readers, cameras, and/or weight sensors are located at multiple locations above the bagging device, below the bagging device, on the sides of the bagging device, and/or behind the bagging device creating a detection zone encompassing the bagging area. Items within the detection zone are automatically identified using different types of sensor data without requiring the manual scanning for faster and more efficient checkout.

20 Claims, 20 Drawing Sheets

SMART BAGGING STATION WITH HALO SENSOR ARRAY

BACKGROUND

Many stores and other retail facilities provide a self-checkout (SCO) in which customers can manually scan products they wish to purchase via one or more barcode scanning devices. These barcode scanning devices can include a hand-held barcode scanner and/or an integrated barcode scanner. When using these barcode scanning devices, the customer typically has to search for a barcode on the product, re-orient the product such that the barcode is facing the barcode scanner, and then move the item across the scanner until the barcode is read. In some cases, the customer may have to make several attempts to move the product across the barcode scanner before the barcode is successfully read. This can be a slow, tedious, and frustrating process for customers.

SUMMARY

Some embodiments provide a smart bagging station having a halo sensor array. A bagging device includes a bag support member for supporting a storage container. A recessed sensor device housing is adjacent to the bagging device. A plurality of sensor devices in a halo configuration form a detection zone substantially encompassing the smart bagging station. The plurality of sensor devices include a set of barcode readers positioned in a curved arrangement within the recessed sensor device housing. The set of barcode readers generates barcode scan data associated with an item as the item passes through the scanning zone above the bagging device. The scanning zone comprising a threshold maximum scanning range of the barcode reader. A set of radio frequency identifier (RFID) tag readers includes a first RFID tag reader located within the recessed sensor device housing generating RFID tag data associated with the item as the item is placed into the storage container. A set of image capture devices includes a first image capture device removably attached to a fixture above the bagging device and a second image capture device located substantially beneath the bagging device. The set of image capture devices generating image data associated with a plurality of items within the detection zone.

Other embodiments provides a method for identifying items within a detection zone of a smart bagging station having a halo sensor array. A first set of sensor data is obtained from a first set of sensor devices positioned in a curved arrangement within a recessed sensor device housing adjacent to a bagging device. The first set of sensor data includes RFID tag data generated by a first RFID tag reader in the first set of sensor devices and barcode data associated with an item passing through a barcode scanning zone above the bagging device generated by a set of barcode readers located within the recessed sensor housing. A second set of sensor data is obtained from a second set of sensor devices removably attached to a top portion of a vertical sensor device support member. The second set of sensor devices are positioned above the bagging device. The second set of sensor devices includes an image capture device generating images of items within the detection zone and a second RFID tag reader generating RFID tag data associated with items within the detection zone. A third set of sensor data is obtained from a third set of sensor devices located below the bagging device, the third set of sensor devices comprising a weight sensor. The first set of sensor data, the second set of sensor data and the third set of sensor data is analyzed to identify an item placed into a storage container associated with the bagging device. An identification of the item placed into the storage container is stored in a data storage device.

Still other embodiments provide a smart bagging apparatus with a halo array of sensor devices. A bagging device includes a bag support member for supporting a storage container. A recessed sensor device housing is adjacent to a back member of the bagging device. A vertical sensor device support member is adjacent to the bagging device. A plurality of sensor devices of a plurality of different sensor device types is arranged in a halo configuration forming a detection zone around the bagging device. The detection zone includes a threshold maximum sensor device range encompassing a bagging area associated with the smart bagging apparatus. A first set of sensor devices is positioned in a curved arrangement within the recessed sensor device housing. The first set of sensor devices generates sensor data associated with an item as the item passes through a scanning zone above the bagging device. The scanning zone includes a threshold range of the first set of sensor devices. A second set of sensor devices is removably attached to a top portion of the vertical sensor device support member. The second set of sensor devices are positioned above the bagging device. The second set of sensor devices include a first image capture device. A third set of sensor devices is positioned below the bagging device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
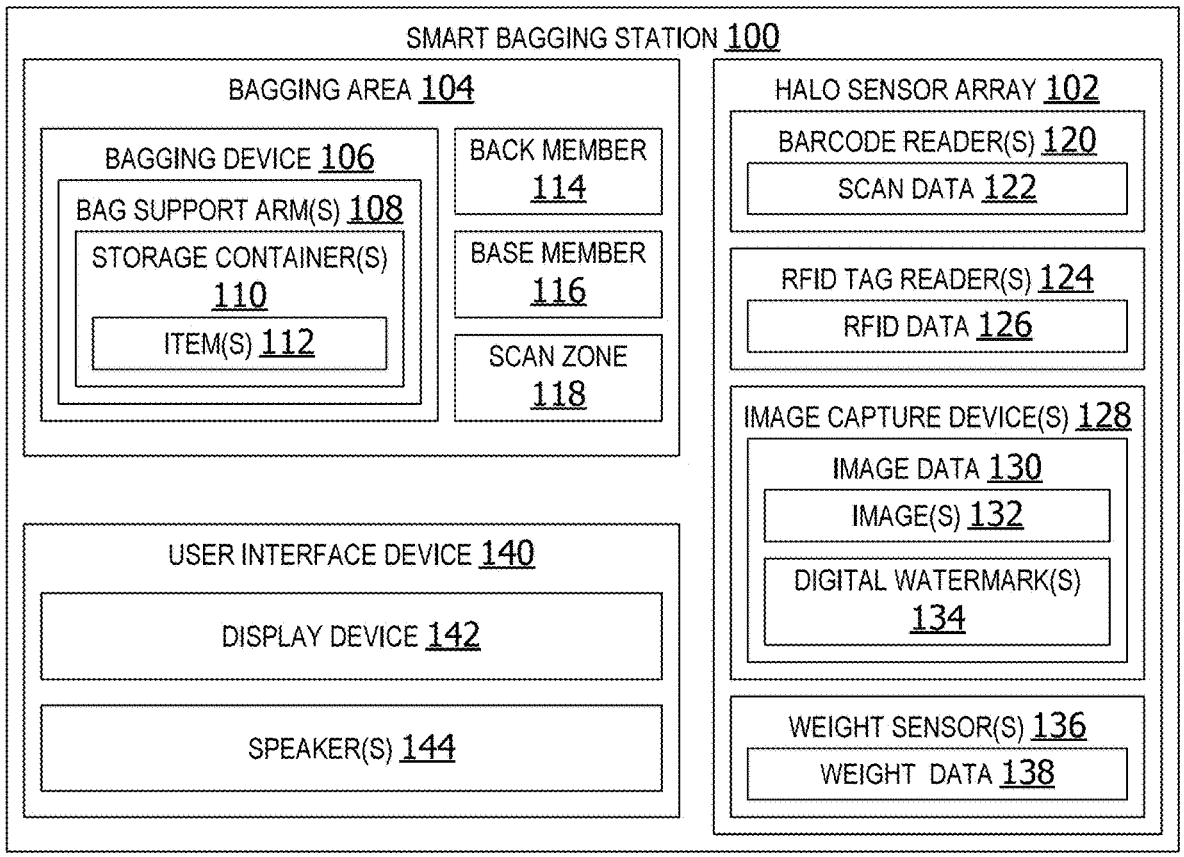
FIG. 1 is an exemplary block diagram illustrating a smart bagging station having a halo sensor array.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some embodiments, . . . " For brevity and clarity of presentation, this implied leading clause is not repeated ad nauseum.

A customer typically has to perform multiple steps involving multiple touch points at SCO to scan and bag items. This is a slow, tedious, and cumbersome process.

Referring to the figures, examples of the disclosure enable a smart bagging station having a halo sensor array including a plurality of different types of sensor devices forming a detection zone encompassing a bagging area of the smart bagging station. In some embodiments, the smart bagging station enables items to be identifies as the items are placed into a bag or other storage container without manually scanning the item, rotating the item, or otherwise rotating or moving the item to a specific side or facing of the item. This enables faster and more convenient checkout for customers while reducing friction for customers at exit from a retail facility.

The computing device operates in an unconventional manner by prioritizing utilization of sensor data from different types of sensor devices based on the specific task being performed, such as identifying an item being placed into a bag, identifying unscanned items in a cart, and/or or identifying an item placed on a produce scale. In this manner, the system eliminates the need for manual scanning of items, reduces checkout time while improving accuracy of checkout scanning results, thereby reducing shrink due to item scanning errors and improving customer satisfaction. This further enables improved item identification accuracy and reduced shrink.

The system further provides a user interface device for presenting issue-specific feedback to users, including color-coded lights and/or issue-specific sounds for improved user efficiency via UI interaction and increased user interaction performance. The system enables faster age verification for age-restricted items via the issue-specific feedback provided by the system.

The smart bagging station allows users to checkout (bag, pay and exit) faster via the self-checkout (SCO) with less friction, improved accuracy, shorter lines at checkout, and reduced shrink. Haptics reinforce customer confidence and provide information indicating success or failure to scan an item to the customer without requiring customers to look at the UI screen. The smart bagging station permits users customers to speed through checkout/exit with minimal friction. The system allows all customers to bag items, pay and exit with speed and minimal friction.

Other embodiments enable seamless detection and identification of items during bagging with sensor data from many different types of sensor devices arranged to form a halo-like detection zone around the bagging area for faster and more accurate item identification. The system eliminates the need for manually scanning items using a hand-held scanner or by passing an item barcode across a sensor plate of an integrated scanning device. This enables reduced time for completing transactions, reduced wait times, and faster completion of checkout.

In some embodiments, the smart bagging station speeds up the checkout process at the front end. In conventional systems in which each item has to be manually scanned, the average self-checkout transaction consists of about ten items and takes about 2 minutes and 15 seconds to complete. With the smart bagging station, the same number of items can be automatically identified during bagging enabling completion of checkout in approximately 60 seconds.

Referring now to FIG. 1, an exemplary block diagram illustrating a smart bagging station 100 having a halo sensor array 102 is shown. The halo sensor array 102 includes a plurality of different types of sensor devices arranged at various positions on the smart bagging station to create a detection zone encompassing a bagging area 104. The bagging area 104 includes a bagging device 106 for supporting one or more storage container(s) 110 for storing, holding, and/or transporting one or more item(s) 112. A storage container in the one or more storage container(s) 110 includes any type of containing for holding one or more item(s) 112. A storage container can include, for example, a bag, box, basket, bucket, or any other type of container. A bag can include a paper bag, a cloth bag, a plastic bag, a tote, or any other type of bag. An item can include any type of item available for purchase or lease in a retail environment. An item can include comestibles, tools, pet supplies, apparel, electronics, books, footwear, home goods, office supplies, party supplies, or any other type of items. The item(s) can include perishable or non-perishable items.

The bagging device 106 is a device for supporting one or more storage container(s) 110. In this example, the bagging device 106 includes one or more bag support arm(s) 108 for support one or more handles on the one or more storage container(s) 110, such as a handle on a bag.

The bagging device 106 optionally includes a back member 114 and/or a base member 116 beneath the storage container(s) 110, when one or more storage container(s) are present on the bagging device 106. At least a portion of the sensor devices in the halo sensor array 102 creates a scan zone 118 above the bagging device 106 for automatically scanning items as the one or more item(s) 112 are placed into a bag or other storage container during bagging at the smart bagging station 100. In other words, as an item passes through the scan zone 118, sensor data associated with the item is generated by one or more of the sensor devices in the halo sensor array 102. The sensor data is analyzed by a halo manager component to identify the item as the item is placed into the storage container without requiring the user to manually scan the item using a hand-held manual scanning device, pass the device over a scanning plate of a scanning device, or rotating the item to position a barcode or other identification making on the item to face a specific scanning device at a checkout. This enables automatic item scanning as an item is bagged without requiring performance of a manual scanning task.

The halo sensor array 102 includes a plurality of sensors located at a variety of different locations on the smart bagging station and around the bagging area 104 to create a detection zone which substantially encompasses a majority of the bagging area. The halo sensor array 102, in some embodiments, includes one or more barcode reader(s) 120 generating scan data 122 associated with the one or more item(s) 112 as the item(s) 112 are being placed into one or more storage container(s) 110. The barcode reader(s) 120 include any type of barcode readers for reading a barcode on an item. A barcode can include a universal product code (UPC), a matrix barcode, a quick response (QR) code, a European article number (EAN), an international standards book number (ISBN), a digital watermark, a shipping container code (SCC), or any other type of barcode.

The halo sensor array 102, in other embodiments, includes one or more radio frequency identifier (RFID) tag reader(s) 124 generating RFID data 126 associated with the one or more item(s) 112 in the bagging area 104. The halo sensor array 102 optionally also includes one or more weight sensor(s) 136 generating weight data 138 associated with the one or more item(s) 112. In this example, a weight sensor, such as a scale, is located directly beneath the bagging device. The weight data 138 is analyzed to identify the weight of each item placed into the storage container(s) 110.

The halo sensor array 102, in other embodiments, includes one or more image capture device(s) 128 generating image data 130 associated with the one or more item(s) 112. An image capture device can include any type of device for generating digital images, such as still images or video. An image capture device can include a digital camera, an infrared (IR) camera, and/or any other type of image capture device. The image(s) 132 generated by the one or more image capture device(s) 128 can include black-and-white images and/or color images. In some embodiments, the image data 130 can also include digital watermark(s) 134 associated with one or more labels or other packaging for one or more of the item(s) 112.

In these embodiments, the image(s) 132 do not include images of users or other individuals. Any images having human users inadvertently included within the images are removed from the image(s) 132 by cropping the images such that only objects of interest, such as the item(s) 112, remain in the cropped images. Images of users or objects which are not of interest are deleted or otherwise discarded. The cropped images containing only the item(s) 112 or other objects of interest are then analyzed to detect and recognize the item(s) 112 in the image(s) 132 using computer vision (CV) image recognition as a service (IRAS) image analysis.

The smart bagging station 100 includes a user interface device 140. The user interface device 140 includes a graphics card for displaying data to the user and receiving data from the user. The user interface device 140 can also include computer-executable instructions (e.g., a driver) for operating the graphics card. Further, the user interface device 140 can include a display device 142 (e.g., a touch screen display or natural user interface) and/or computer-executable instructions (e.g., a driver) for operating the display device 142. The user interface device 140 can also include one or more of the following to provide data to the user or receive data from the user: one or more speaker(s) 144, a sound card, a camera, a microphone, a vibration motor, one or more accelerometers, a BLUETOOTH® brand communication module, wireless broadband communication (LTE) module, global positioning system (GPS) hardware, and a photoreceptive light sensor.

In some embodiments, the smart bagging station 100 includes additional other features and devices not shown in FIG. 1. For example, the smart bagging station can optionally include devices, such as, but not limited to, a lane light, hand scanner, card reader, indicator light bar, cart parking pad, coin in/cash in and cash out slot(s), receipt printer, receipt output slot, kickplate, load scale, projector, bill note recycler, etc.

In some embodiments, the smart bagging station 100 provides a station for faster checkout where customer flow is natural and in one direction toward the exit. Each item is touched only a single time during checkout, where the customer removes the item from the cart and places it into a bag without any additional turning, re-orientations, or manual scanning required. This enables customers to efficiently bag from their tote or cart. Items are identified when they are placed in the bag. Identified items requiring weight are weighed when placed in the bag. Full bags can easily slide down the table to make room for more bagged items. Bagging space can hold up to ten bags or more in some embodiments. The UI displays a list of items that have been successfully identified when added to the bag. Haptics, like colorful lights and sounds, reinforce the confidence of item identification. Items not being bagged can optionally be identified using a hand scanner.

Figure 2:
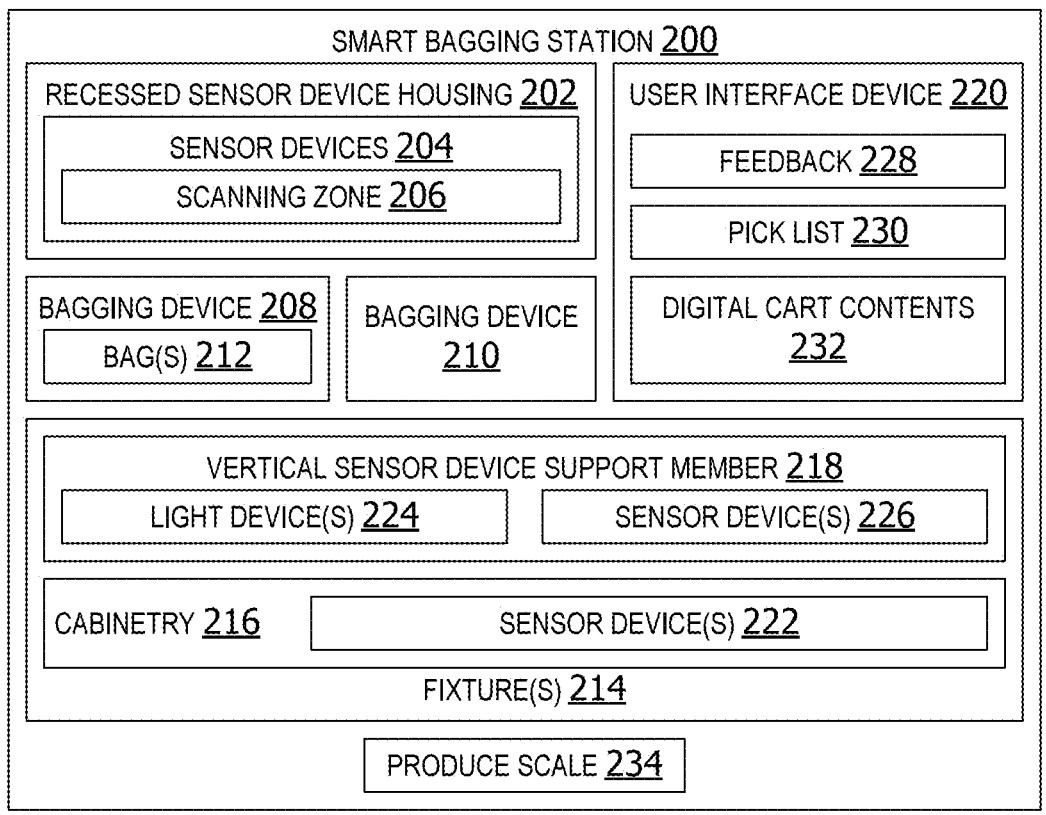
FIG. 2 is an exemplary block diagram illustrating a smart bagging station having a recessed sensor device housing for a plurality of sensor devices.

FIG. 2 is an exemplary block diagram illustrating a smart bagging station 200 having a recessed sensor device housing 202 for a plurality of sensor devices 204. The smart bagging station 200 is a bagging station having a halo sensor array, such as, but not limited to, the smart bagging station 100 in FIG. 1. The plurality of sensor devices 204 generates sensor data associated with items passing within a scanning zone 206. The scanning zone 206 defines a sensor range of one or more sensor devices. In this example, the scanning zone 206 is an area above a bagging area including one or more bagging devices, such as, but not limited to, the bagging device 208 and 210. Each bagging device supports one or more storage containers, such as, but not limited to, one or more bag(s) 212. Each of the one or more bag(s) 212 is a container, such as, but not limited to, the one or more storage container(s) 110.

The smart bagging station 200 includes one or more fixture(s) 214, such as, but not limited to, cabinetry 216 and/or a vertical sensor device support member 218. The cabinetry 216 is a cabinet or other furniture for supporting the bagging device and/or a user interface device 220. The cabinetry 216 in some embodiments includes one or more sensor device(s) 222 removably mounted to one or more portions of the cabinetry 216. In this example, one or more sensor devices are mounted to an underside of the bagging device 208 and/or the bagging device 210 enabling the sensor device(s) 222 to generate sensor data associated with any side of an item which is downward facing when placed into the bag(s) 212.

The vertical sensor device support member 218 is a vertical member, such as a pole, column, pillar, pipe, railing, or other support structure for mounting devices, such as, but not limited to, one or more light device(s) 224 and/or one or more sensor device(s) 226. The one or more sensor device(s) 226 in this example includes an RFID tag reader and/or one or more image capture devices having a field of view associated with a top of the bagging device 208 and/or the bagging device 210.

The user interface device 220 is a device for receiving input from a user and/or providing output to a user, such as, but not limited to, the user interface device 140 in FIG. 1. In this example, the user interface device 220 outputs data to a user, such as, but not limited to, issue-specific feedback 228, an abbreviated item pick list 230 and/or digital cart contents 232. Issue-specific feedback 228 is item scan feedback associated with each item that is automatically scanned via the halo sensor array, including the sensor devices 204 within the recessed sensor device housing 202. The issue-specific feedback can include audio feedback and/or visual (graphical) feedback, such as lights, graphical icons, and/or text displayed on a display screen.

The abbreviated item pick list 230 is a filtered list of candidate items associated with an unknown item. The user is prompted to select an item from the abbreviated item pick list 230. The selected item from the abbreviated item pick list is used to identify the item. In some embodiments, the abbreviated item pick list is generated by filtering items from a comprehensive list of all possible items using scan data generated by one or more of the sensor devices. For example, if images generated by an image capture device indicates that the unidentified item on a produce scale in the one or more produce scale(s) 234 is yellow, an abbreviated item pick list 230 can include candidate items that are also yellow, such as bananas, plantains, etc.

The digital cart contents 232 is a list of items which have been scanned, identified using the scan data, and added to the digital cart contents 232. The digital cart contents is a list of all identified items which have been placed into the bag(s) 212.

Figure 3:
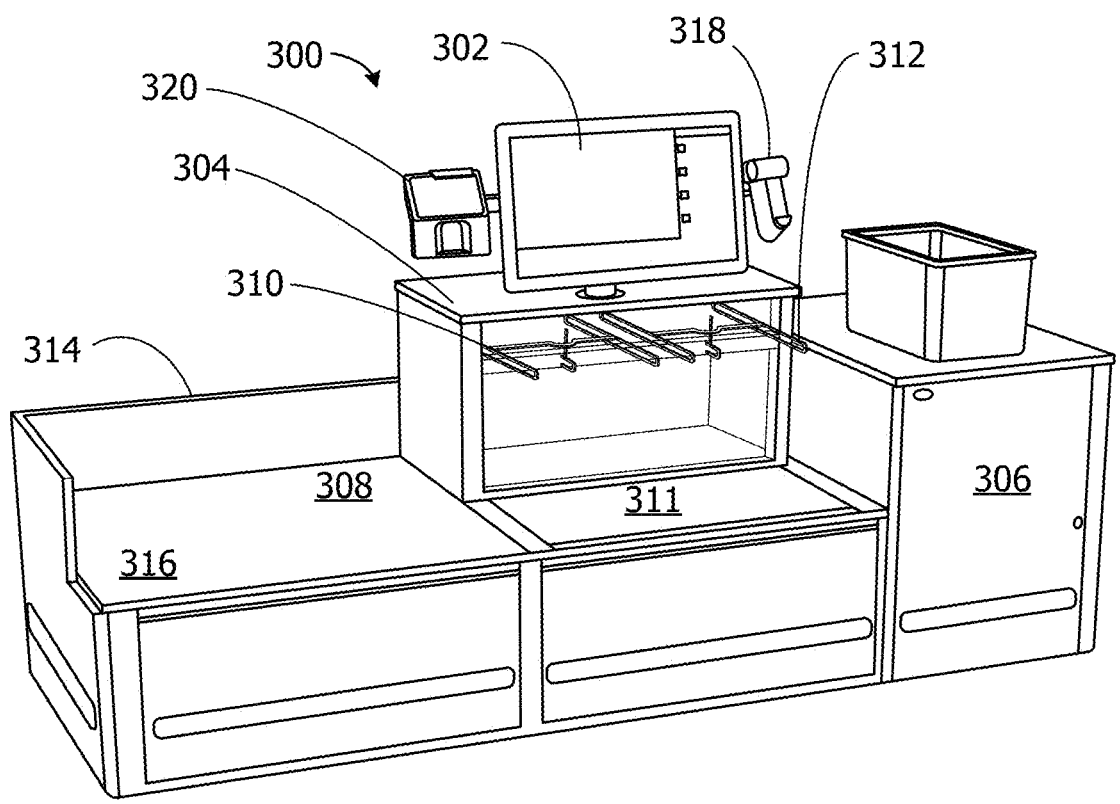
FIG. 3 is an exemplary diagram illustrating a smart bagging station having a user interface and a recessed sensor device housing.

FIG. 3 is an exemplary diagram illustrating a smart bagging station 300 having a user interface(UI) 302 and a sensor device housing 304. The smart bagging station 300 is a device for smart bagging of items using a halo sensor array, such as, but not limited to, the smart bagging station 100 in FIG. 1 and/or the smart bagging station 200 in FIG. 2. The sensor device housing 304, in some embodiments, is a housing located substantially behind one or more bagging devices, such as, but not limited to, the recessed sensor device housing 202 in FIG. 2.

In this example, the smart bagging station 300 includes cabinetry 306. The cabinetry 306 includes cabinets or other furniture for holding up and/or supporting the UI 302, sensor device housing 304, bagging device 310 and/or the bagging device 312. In this example, the bagging device 310 and the bagging device 312 include horizontal bars extending outward away from the sensor housing for supporting one or more handles on a bag, such as where a bag hangs from the horizontal bars. In other embodiments, the horizontal bars provide a pair of side support members for a bag without handles sitting on the base member 311, such as a paper bag. The cabinetry 306 can include any type of cabinets, shelves, cases, or other furniture, such as, but not limited to, the cabinetry 216 in FIG. 2.

The bagging area 308 is an area for bagging items and/or temporary storage of bagged items. The bagging area 308 in this example includes bagging devices, a railing 314 and a substantially flat surface 316 for placing items and/or bags of items during a bagging process. The bagging device 310 and/or the bagging device 312 include one or more support arms, a back member, and a base member for supporting a bag or other container for storing items after the item is passed through the scanning zone located substantially above the bagging devices.

The smart bagging station in some embodiments optionally also includes a hand scanner 318 and/or a card reader 320. A hand scanner 318 may be employed where the halo scanner array fails to detect an item being bagged and/or where an error occurs during scanning. The card reader 320 includes any type of card reader device for reading a payment card during completion of a purchase transaction associated with purchasing one or more items bagged at the smart bagging station.

Figure 4:
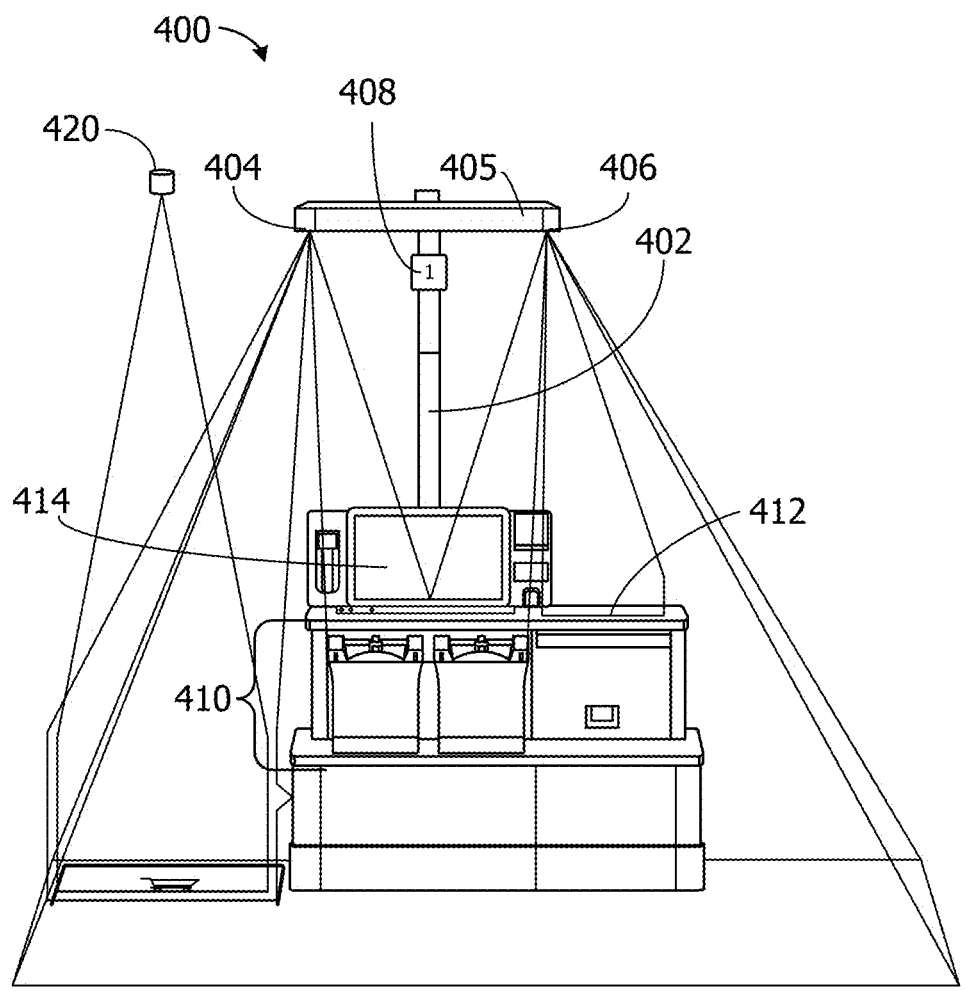
FIG. 4 is an exemplary diagram illustrating a smart bagging station having a vertical sensor device support member.

Turning now to FIG. 4, an exemplary diagram illustrating a smart bagging station 400 having a vertical sensor device support member 402. In this example, a light device 405 is mounted to a top portion of the vertical sensor device support member 402. In some embodiments, the light device 405 is a lane light.

A first camera 404 is mounted to an underside of the light device. A second camera 406 is mounted to an underside of the light device on an opposite side of the light device. In some embodiments the first camera 404 and/or the second camera 406 is a computer vision (CV) camera providing image data to one or more ML model(s) for use in performing CV objection detection and recognition. In a non-limiting example, the ML model(s) includes one or more pre-trained you only live once (YOLO) version five (v.5) model. However, the embodiments are not limited to the YOLOv.5 model. In other embodiments, any type of pre-trained ML model for performing CV IRAS object detection and recognition using image data can be used. The ML model(s) are trained using labeled training data, including pre-labeled cropped images of items found in an inventory of a retail environment, such as a store.

An RFID tag reader 408 is removably mounted to a top portion of the vertical sensor device support member 402 such that the RFID tag reader 408 can detect RFID tag data emitted by any RFID tags within the detection zone surrounding the smart bagging station 400. The camera 404 and the camera 406 have a lens facing downward such that a field of view of each of the cameras is directed towards a top of the bagging devices in the bagging area 410.

The smart bagging station 400 optionally also includes a product scale 412 for weighing produce or other items which are sold by weight, such as, but not limited to, the product scale(s) 234 in FIG. 2. The smart bagging station 400, in other embodiments, includes a user interface (UI) device 414 for providing feedback to the user. The UI device 414 is a device, such as, but not limited to, the user interface device 140 in FIG. 1, the user interface device 220 in FIG. 2, and/or the UI 302 in FIG. 3.

In some embodiments, the smart bagging station 400 includes one or more wide angle scanners mounted to one or more locations on the smart bagging station. The wide angle scanners include UPC barcode readers and/or RFID tag readers. Wide angle scanners allow a larger view angle for the sensor devices and larger reach to reduce or eliminate the need for item orientation/re-orientation and increase transaction speed via the smart bagging station.

In other embodiments, the halo sensor array optionally includes one or more additional sensor devices mounted around the bagging area. For example, a camera 420 can be mounted to a portion of a ceiling or other overhead fixture with the camera angled downward such that the field of view of the camera encompasses a shopping cart parking or docking area, staging area or other area adjacent to the bagging area. In other words, the halo sensor array includes a plurality of sensors directed toward the bagging area creating a detection zone encompassing the bagging area. The halo sensor array can optionally include additional sensor devices enlarging the detection zone to encompass the entire smart bagging station and/or encompass substantially all of the smart bagging structure.

Figure 5:
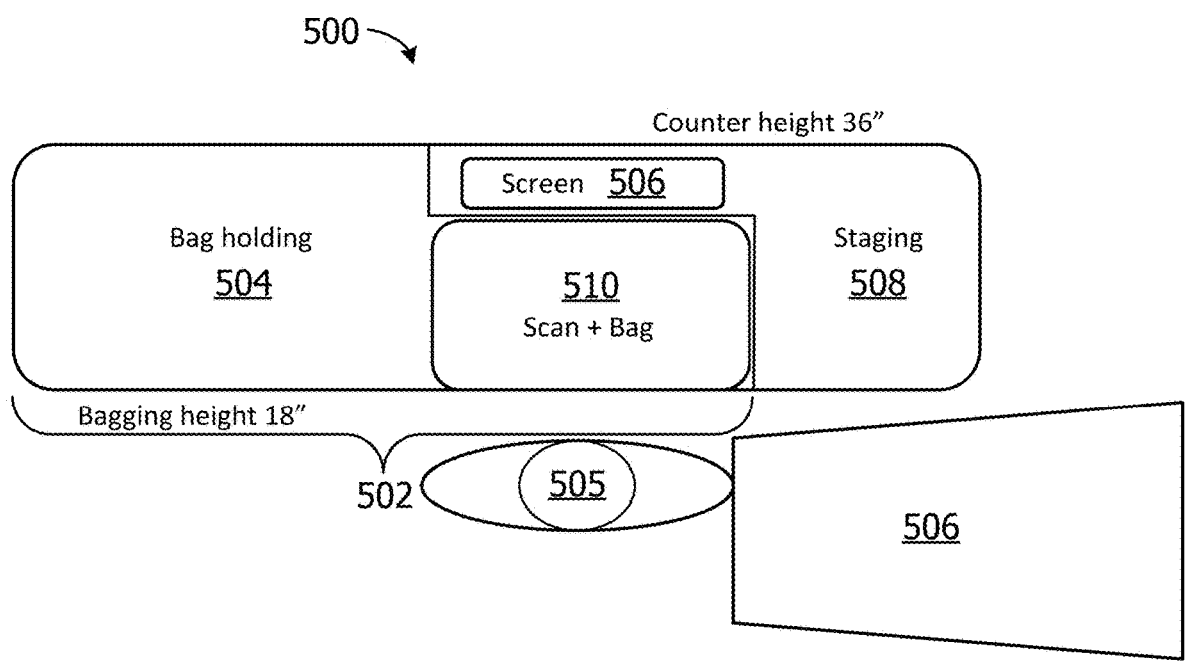
FIG. 5 is an exemplary diagram illustrating a bagging area of a smart bagging station.

FIG. 5 is an exemplary diagram illustrating a bagging area 502 of a smart bagging station 500. In this example, a user 505 removes items from a shopping cart 506. The user can optionally place the items removed from the cart 506 onto the staging area 508. However, this is not required for the bagging process.

In this scenario, the user places each item removed from the shopping cart 506 into a bag or other container supported on a bagging device 510. As the user 505 places each item into the bag, the item is automatically scanned by one or more sensor devices in the halo sensor array. For example, an RFID tag on the item can be read by an RFID tag reader, a barcode or digital watermark can be read by a barcode scanner or an image capture device, etc. When the bag is full, the user can optionally remove the bag of items from the bagging device and place the bag into the bag holding area 504. As each item is placed into a bag, the item is automatically detected, identified, and added to a digital cart inventory.

In this example, the bagging height is eighteen inches wide, and the counter height is thirty-six inches high. However, the embodiments are not limited to a thirty-six inch counter height and/or an eighteen inch bagging area height. In other embodiments, the bagging area counter height can be less than eighteen inches or more than eighteen inches. Likewise, in other embodiments, the counter height can be less than thirty-six inches or greater than thirty-six inches.

Figure 6:
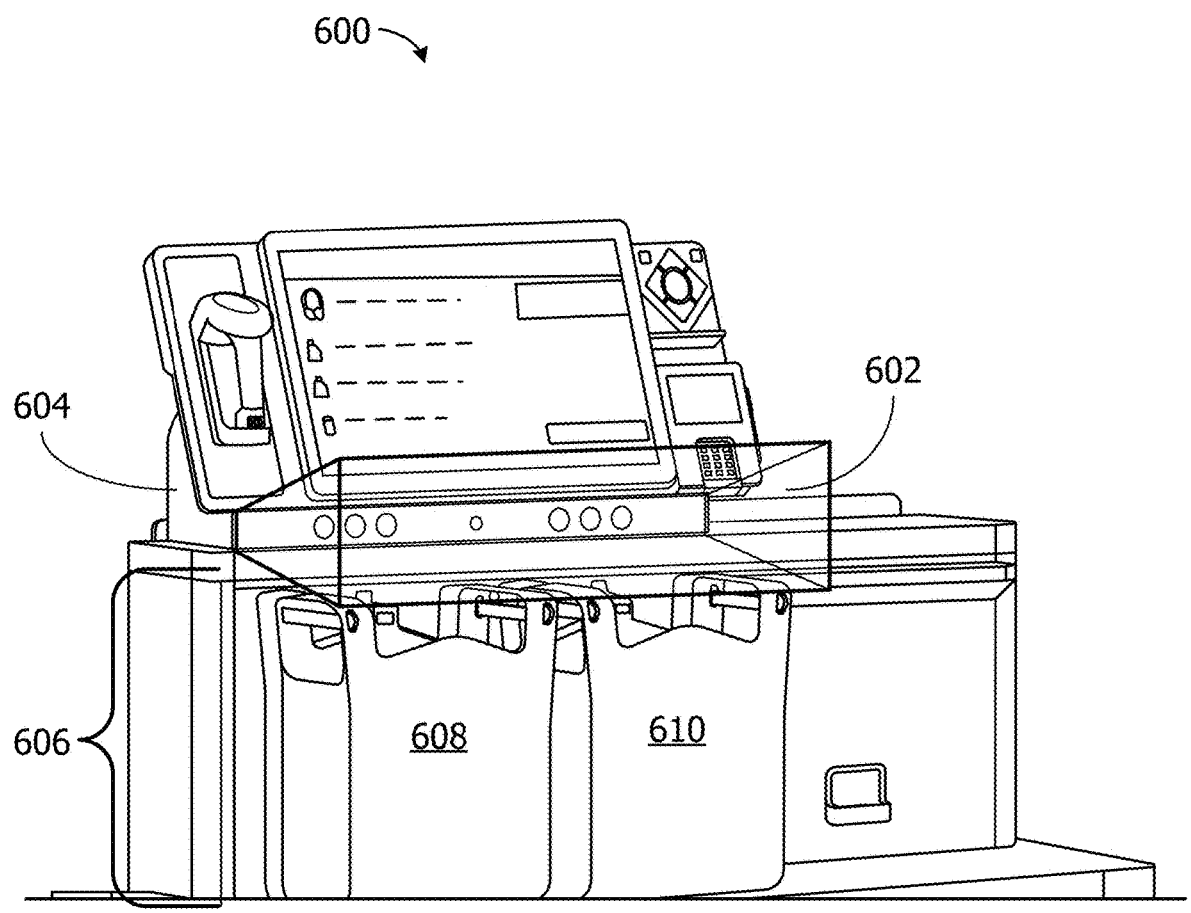
FIG. 6 is an exemplary diagram illustrating a scanning zone generated by sensor devices within a recessed sensor device housing.

Referring now to FIG. 6, an exemplary diagram illustrating a scanning zone 602 generated by sensor devices within a sensor device housing 604 of a smart bagging station 600. The scanning zone 602 is an area substantially above the bagging area 606 in which an item can be detected by one or more sensor devices within the sensor device housing 604 and/or mounted on the sides and/or bottom of the bagging area. As an item is passed through the scanning zone 602, the one or more sensor devices generates scan data associated with the item. The sensor device housing 604 is a housing for one or more sensor devices positioned substantially behind the bagging area and/or above the bagging area, such as, but not limited to, the recessed sensor device housing 202 in FIG. 2 and/or the sensor device housing 304 in FIG. 3. In this example, the bagging devices support a first set of bags 608 on a first bagging device and a second set of bags 610 supported on a second bagging device.

Figure 7:
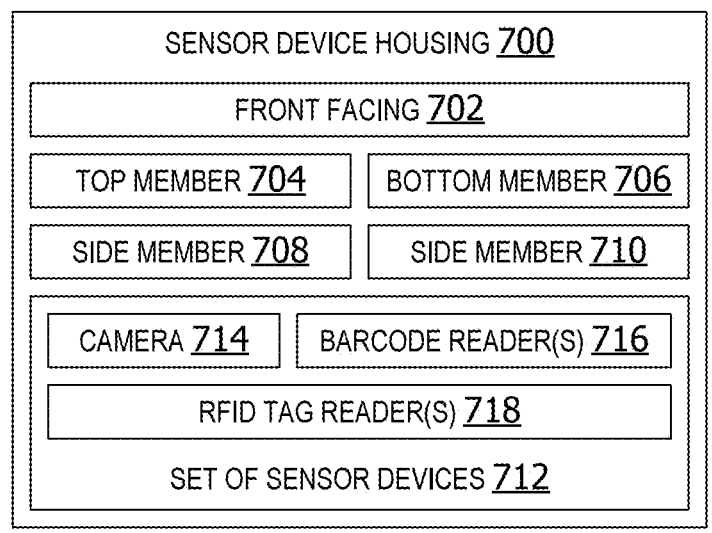
FIG. 7 is an exemplary block diagram illustrating a recessed sensor device housing.

FIG. 7 is an exemplary block diagram illustrating a recessed sensor device housing 700. The sensor device housing 700 is a housing or compartment containing a set of sensor devices 712, such as, but not limited to, the recessed sensor device housing 202 in FIG. 2, the sensor device housing 304 in FIG. 3, and/or the sensor device housing 604 in FIG. 6. The sensor device housing 700 in this example is recessed behind one or more bagging devices. However, in other embodiments, the sensor device housing 700 is located beneath the bagging devices, above the bagging devices or in any other location substantially adjacent to the bagging devices in the bagging area.

The sensor device housing 700 in some embodiments includes a front facing 702, a top member 704, a bottom member 706, a first side member 708 and a second side member 710. The sensor device housing 700 can optionally also include a back member (not shown). The front facing 702 in some embodiments is a transparent or semi-transparent front covering. In this example, the sensor device housing 700 sits substantially behind a back member of one or more bagging devices within a bagging area of a smart bagging station.

The set of sensor devices 712 is a set of one or more sensor devices, such as, but not limited to, the sensor devices 204 in FIG. 2. In some embodiments, the set of sensor devices 712 includes a set of one or more camera(s) 714, a set of one or more barcode reader(s) 716. And/or a set of one or more RFID tag reader(s) 718. However, the embodiments are not limited to cameras, barcode readers, and RFID tag readers. In other embodiments, the sensor device housing 700 includes other types of sensor devices, such as, but not limited to, motion sensors, temperature sensors, light sensors, infrared sensors, or any other type of sensor device. In this example, the barcode reader(s) and/or the camera(s) 714 can be used to detect digital watermarks in addition to detecting UPC codes, QR codes, and other identification markers on an item as the item is passing through the scanning zone. Likewise, in still other embodiments, the sensor device housing 700 may not include camera(s) 714, barcode reader(s) 716 and RFID tag reader(s) 718.

In some embodiments, the sensor device housing 700 can include only a plurality of barcode readers. In other embodiments, the sensor device housing 700 can include only one RFID tag reader and two or more barcode reader(s) 716. In still other embodiments, the sensor device housing 700 includes one or more camera(s) 714 and one or more barcode reader(s) 716 without any RFID tag readers. Thus, the sensor device housing 700 can include any combination of different types of sensor devices and any number of instances of each type of sensor device.

Figure 8:
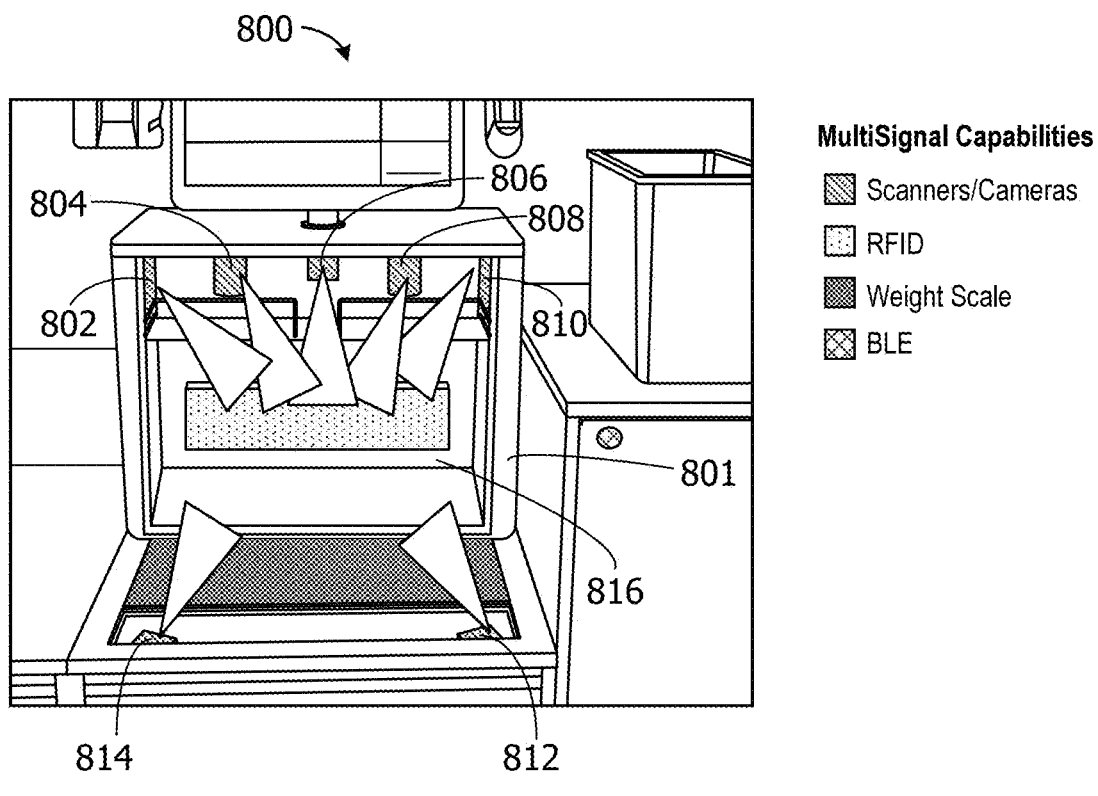
FIG. 8 is an exemplary diagram illustrating a cross section view of a recessed sensor device housing and a plurality of sensor devices.

FIG. 8 is an exemplary diagram illustrating a cross section view of a recessed sensor device housing 801 and a plurality of sensor devices associated with a smart bagging station 800. The plurality of sensor devices includes scanners, cameras, RFID tag readers, weight scales, and one or more near field communications devices, such as, but not limited to, one or more BLUETOOTH® low energy (BLE) receivers.

In this example, the plurality of sensor devices includes a first sensor device 802, a second sensor device 804, a third sensor device 806, a fourth sensor device 808, and a fifth sensor device 810 within the recessed sensor device housing 801. A sixth sensor device 812 and a seventh sensor device 814 are located outside the recessed sensor device housing. The sixth sensor device 810 and the seventh sensor device 814 are removably attached to a portion of the smart bagging station cabinetry below the bagging device(s). The sensor devices 802-814 provide an array of sensor devices creating a halo-like item detection zone surrounding the bagging area.

In this example, the recessed sensor device housing 801 includes five sensor devices mounted within the interior 816 of the recessed sensor device housing 801. However, the embodiments are not limited to five sensor devices. In other embodiments, any number of sensor devices are contained within the recessed sensor device housing 801. For example, the set of sensor devices within the recessed sensor device housing 801 can include four sensor devices, three sensor devices, six sensor devices, or any other number of sensor devices.

In this example, two sensor devices are mounted below the bagging area. However, in other embodiments, a single sensor device is mounted below the bagging area. In still other embodiments, three or more sensor devices are mounted below the bagging area. In still other embodiments, additional sensor devices are removably mounted to a portion of the smart bagging device cabinetry to a right side of the bagging area and/or to the left side of the bagging area.

The sensor devices shown in FIG. 8 can include any type of sensor device. For example, the sensor device 802 can be implemented as a barcode scanner device, a camera, an RFID tag reader, or any other type of sensor device. In one example, the sensor device 802, sensor device 804, sensor device 806, sensor device 808, and sensor device 810 include an array of barcode scanners in a semicircle configuration. However, in other embodiments, one or more of the sensor devices within the recessed sensor device housing include one or more cameras and/or one or more RFID tag readers.

In this example, the sensor device 812 and the sensor device 814 includes an image capture device and a weight sensor. However, the embodiments are not limited to an image capture device and a weight sensor below the bagging device(s) in the bagging area. In other embodiments, the sensor device 812 and/or the sensor device 814 can include an RFID tag reader, barcode scanner, or any other type of sensor device.

Figure 9:
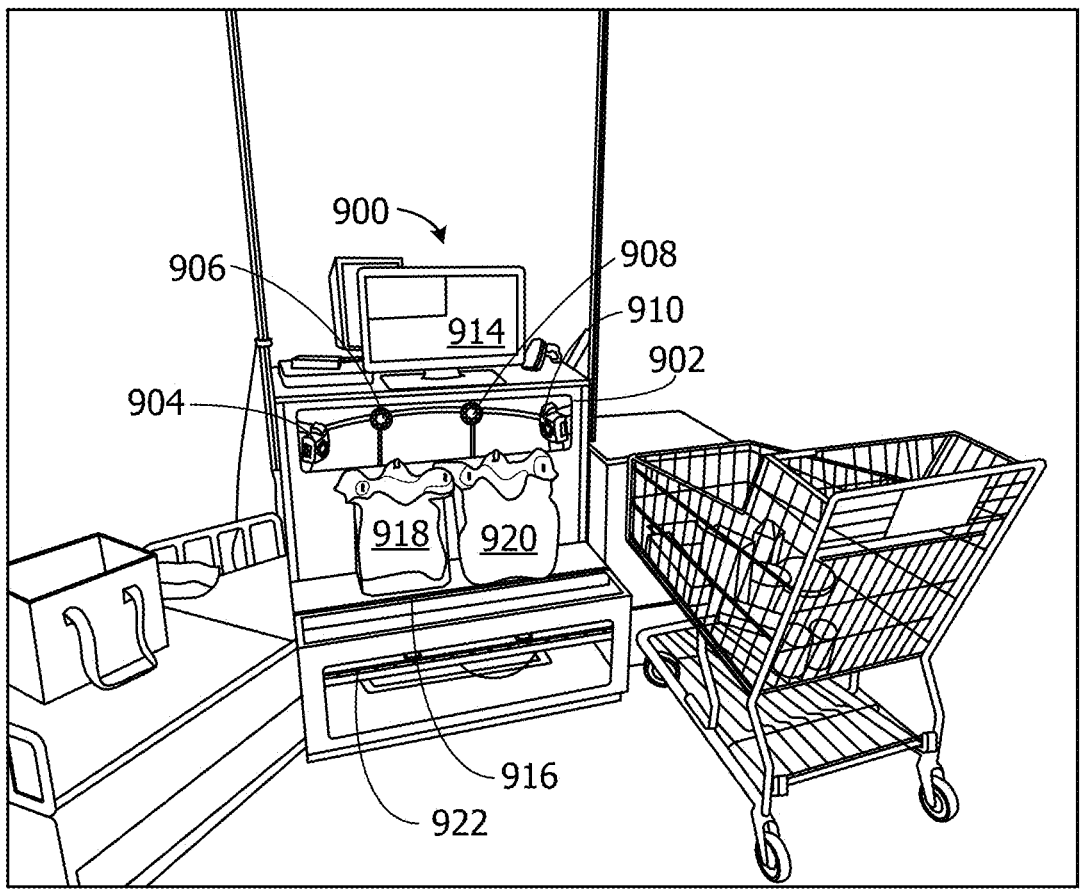
FIG. 9 is an exemplary diagram illustrating a bagging area having a plurality of sensor devices in a semicircle arrangement within a recessed sensor device housing.

FIG. 9 is an exemplary diagram illustrating a bagging area 900 having a plurality of sensor devices in a semicircle arrangement within a recessed sensor device housing 902. In this example, the bagging area 900 includes a user interface device 914, a recessed sensor device housing 902, and a bagging platform 916 supporting a first bagging device 918 having one or more bags and a second bagging device 920 having one or more bags for use in bagging purchased items.

The plurality of sensor devices within the recessed sensor device housing 902 is a device such as, but not limited to, the recessed sensor device housing 202 in FIG. 2, sensor device housing 304 in FIG. 3, the recessed sensor device housing 604 in FIG. 6, and/or the recessed sensor device housing 700 in FIG. 7. The recessed sensor device housing 902 includes a first sensor device 904 a second sensor device 906, a third sensor device 908, and a fourth sensor device 910 arranged in a semicircle. However, the embodiments are not limited to four sensor devices within the recessed sensor device housing 902. In other embodiments, the plurality of sensor devices includes two sensor devices, five sensor devices, or any other number of sensor devices.

The plurality of sensor devices in the halo sensor array optionally also includes one or more sensor devices within an area 922 beneath the bagging area. In this example, the area 922 beneath the bagging area includes at least one weight sensor. The area 922 can optionally also include one or more scanners, cameras, RFID tag readers, motion sensors, near field communications receivers, or any other type of sensor device.

Figure 10:
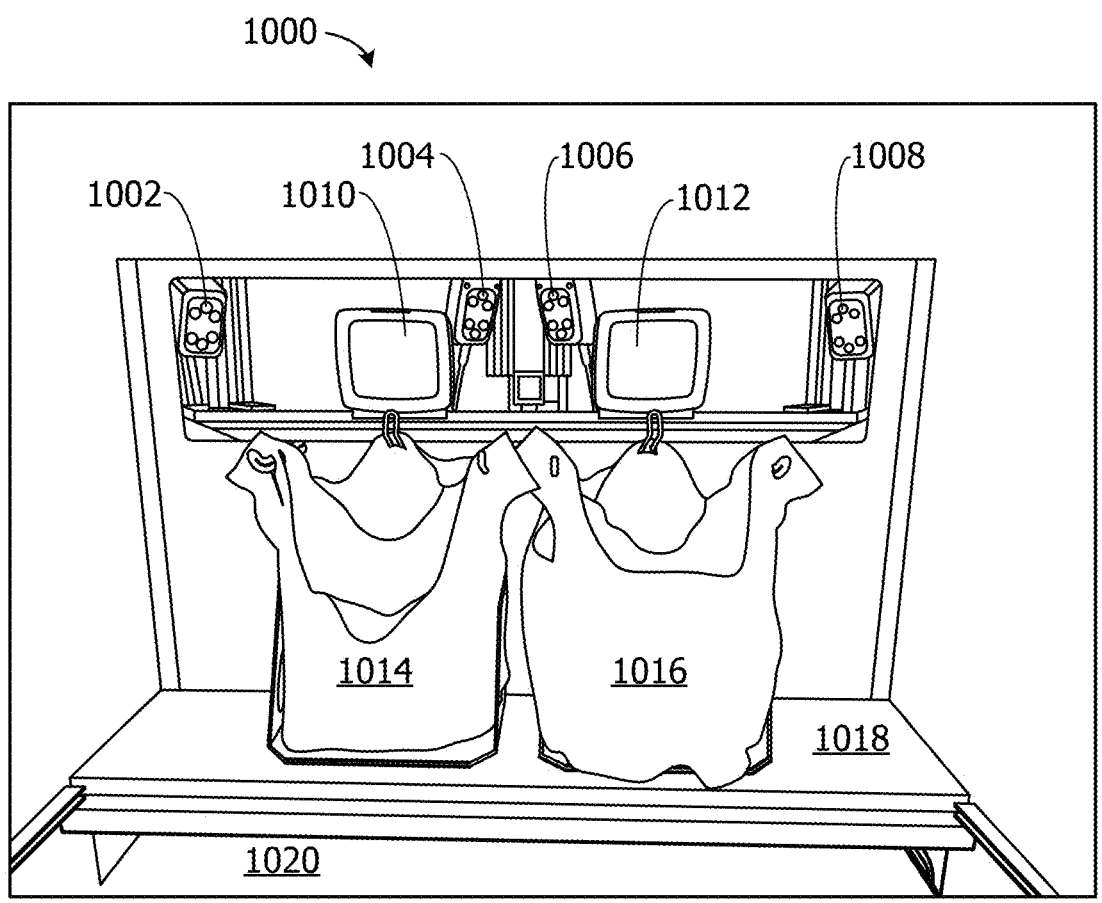
FIG. 10 is an exemplary diagram illustrating a plurality of different types of sensor devices within a recessed sensor device housing located behind a pair of bagging devices.

FIG. 10 is an exemplary diagram illustrating a plurality of different types of sensor devices within a recessed sensor device housing 1000 located behind a pair of bagging devices. The plurality of different types of sensor devices in this example includes a first sensor device 1002, a second sensor device 1004, a third sensor device 1006, and a fourth sensor device 1008 of a first type of sensor device. The first type of sensor device can be any type of sensor device, such as, but not limited to, a barcode scanner.

In some embodiments, the plurality of sensor devices within the recessed sensor device housing 902 includes a fifth sensor device 1010 and a sixth sensor device 1012 of a second type of sensor device. In other words, the fifth sensor device 1010 and the sixth sensor device 1012 are different types of sensor devices than the first sensor device 1002, the second sensor device 1004, the third sensor device 1006, and the fourth sensor device 1008. In this example, the fifth sensor device 1010 and the sixth sensor device 1008 include RFID tag reader(s) and/or image capture device(s), such as a camera. The plurality of sensor devices generate sensor data associated with each item placed into the bag 1014 and/or the bag 1016 at least partially supported on a base member 1018 of the bagging area.

Figure 11:
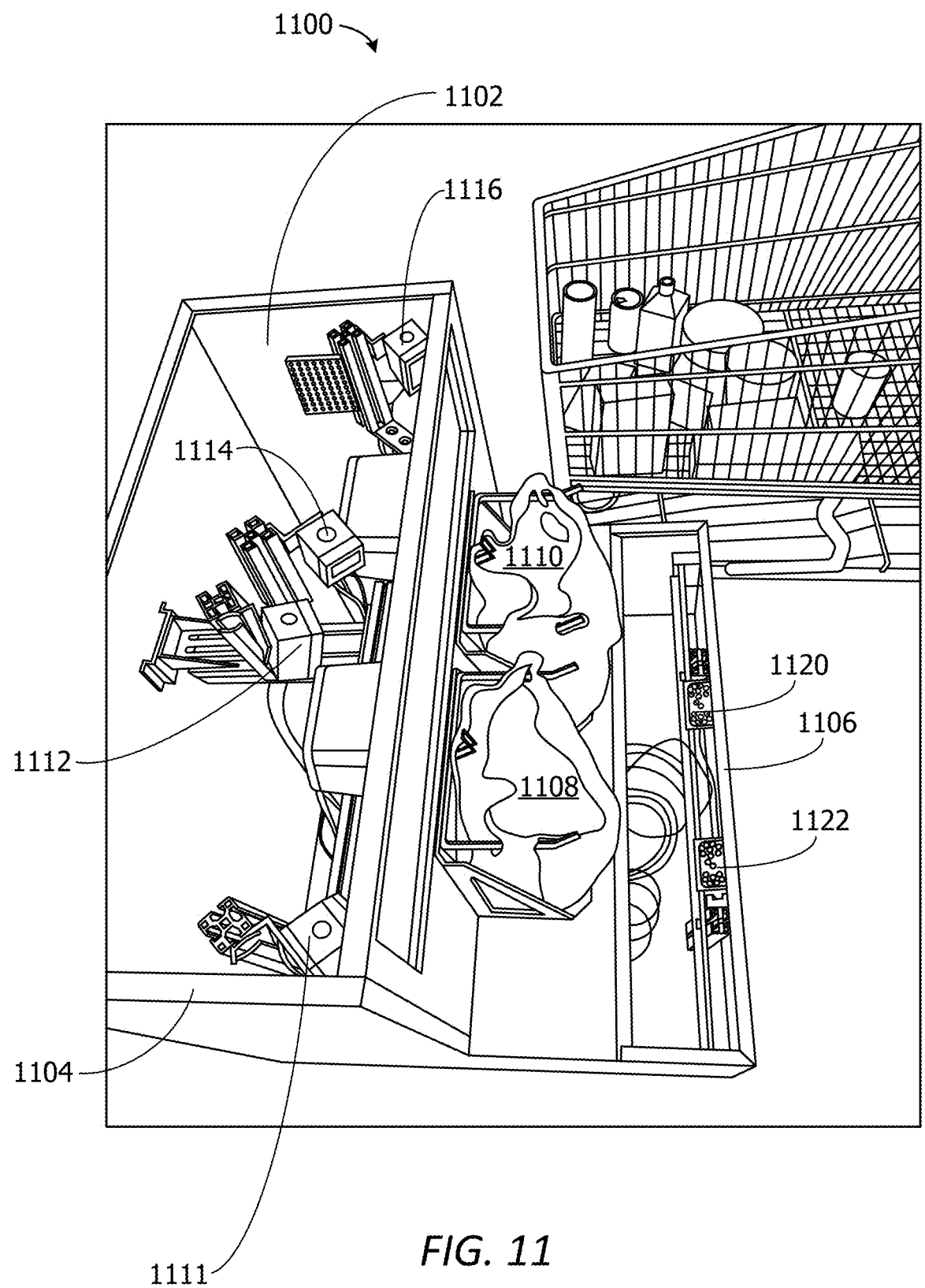
FIG. 11 is an exemplary diagram illustrating an interior compartment of a recessed sensor device housing containing a plurality of barcode scanners.

FIG. 11 is an exemplary diagram illustrating an interior compartment 1102 of a recessed sensor device housing 1104 containing a plurality of barcode scanners. The bagging area 1100, in this example, includes the recessed sensor device housing 1104 and a bagging platform 1106 having a first bagging device 1108 and a second bagging device 1110. However, the embodiments are not limited to two bagging devices. In other embodiments, the bagging area of the smart bagging station can include a single bagging device, as well as three or more bagging devices supporting bags or other storage containers. The plurality of sensor devices can optionally also include one or more sensor devices within an area 1020 below the bagging device.

In this example, the bagging area includes a first bagging device comprising three horizontal bars extending outward away from the sensor device housing. Two of the bars support each handle on a bag holder supporting bags having a pair of handles. The bag holder optionally includes a center bar with a hook on end on which an aperture substantially in the center of a bag rim can be hooked over the center bar for additional bag support.

The plurality of barcode scanners, in this example, include a first barcode scanner device 1111, a second barcode scanner device 1112, a third barcode scanner device 1114, and a fourth barcode scanner device 1116 for scanning each item placed into a bag associated with the first bagging device and/or the second bagging device.

In other embodiments, the halo sensor array includes additional sensor devices below the bagging area. In this example, a barcode scanner 1120 and another barcode scanner 1122 are located beneath the bagging area and angled upward so as to generate scan data associated with items being placed into a bag associated with the first bagging device 1108 and/or a bag associated with the second bagging device 1110. However, the embodiments are not limited to barcode scanners beneath the bagging area. In other embodiments, the halo sensor array includes other sensors beneath the bagging area, such as, but not limited to, a scale (weight sensor), image capture device, motion detector, light sensor, RFID tag reader, or any other type of sensor device.

Figure 12:
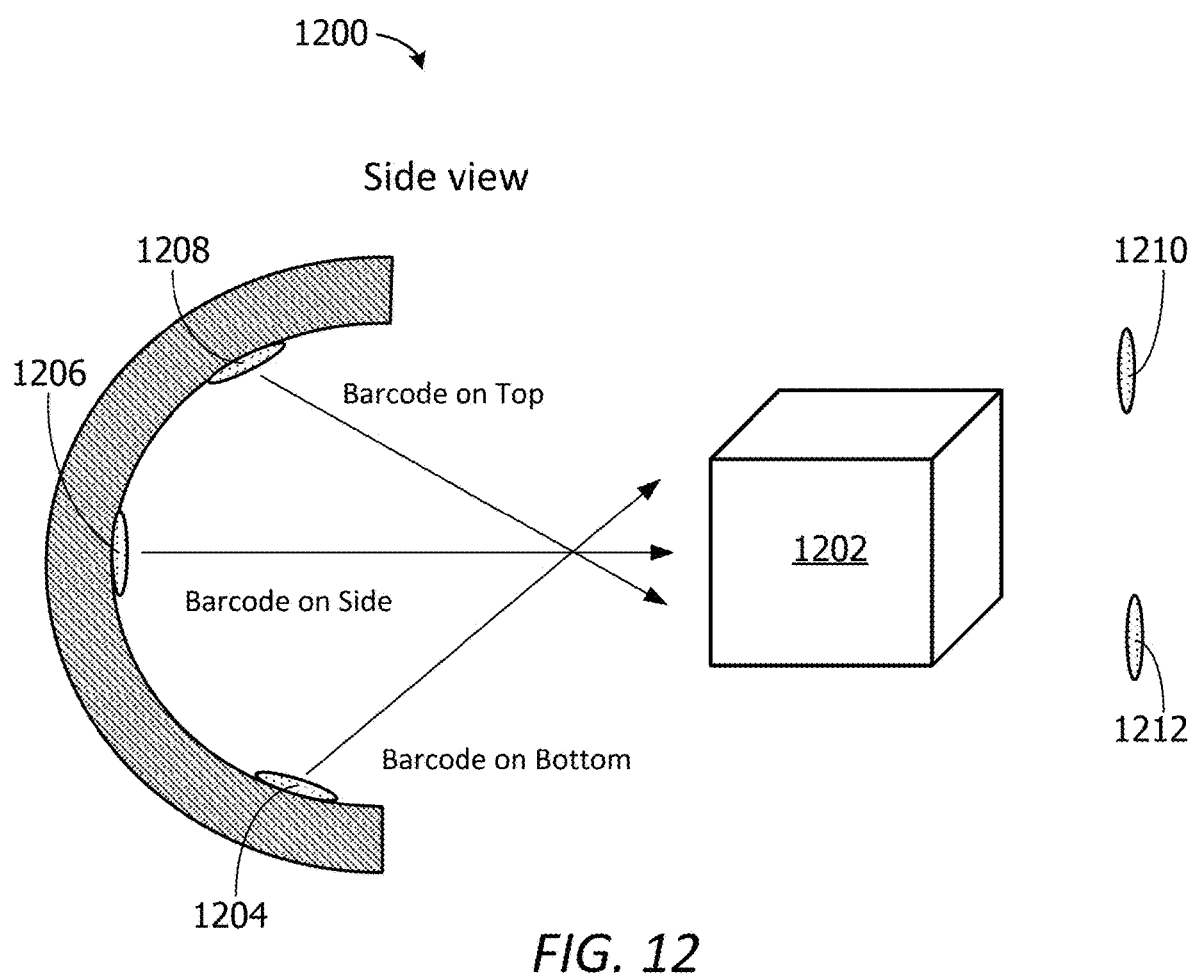
FIG. 12 is an exemplary diagram illustrating a plurality of sensor devices in a halo arrangement for scanning multiple sides of an item.

FIG. 12 is an exemplary diagram illustrating a plurality of sensor devices 1200 in a halo arrangement for scanning multiple sides of an item 1202. In this example, the plurality of sensor devices includes a first sensor device 1204, a second sensor device 1206, and a third sensor device 1208 within a recessed sensor device housing. The plurality of sensor devices also includes a fourth sensor device 1210 and a fifth sensor device 1212 located outside the recessed sensor device housing.

For example, the fourth sensor device 1210 can be mounted to a portion of the smart bagging station cabinetry at a first side of the bagging area and the fifth sensor device can be mounted to another portion of the smart bagging station cabinetry at the opposite side of the bagging area. However, the embodiments are not limited to the sensor device 1210 and the sensor device 1212 mounted to opposite sides of the bagging area. In other embodiments, the sensor device 1210 and/or the sensor device 1212 can be mounted beneath the bagging area, mounted to a top portion of a vertical sensor device support member above the bagging area, or on any other location proximate the bagging area.

Figure 13:
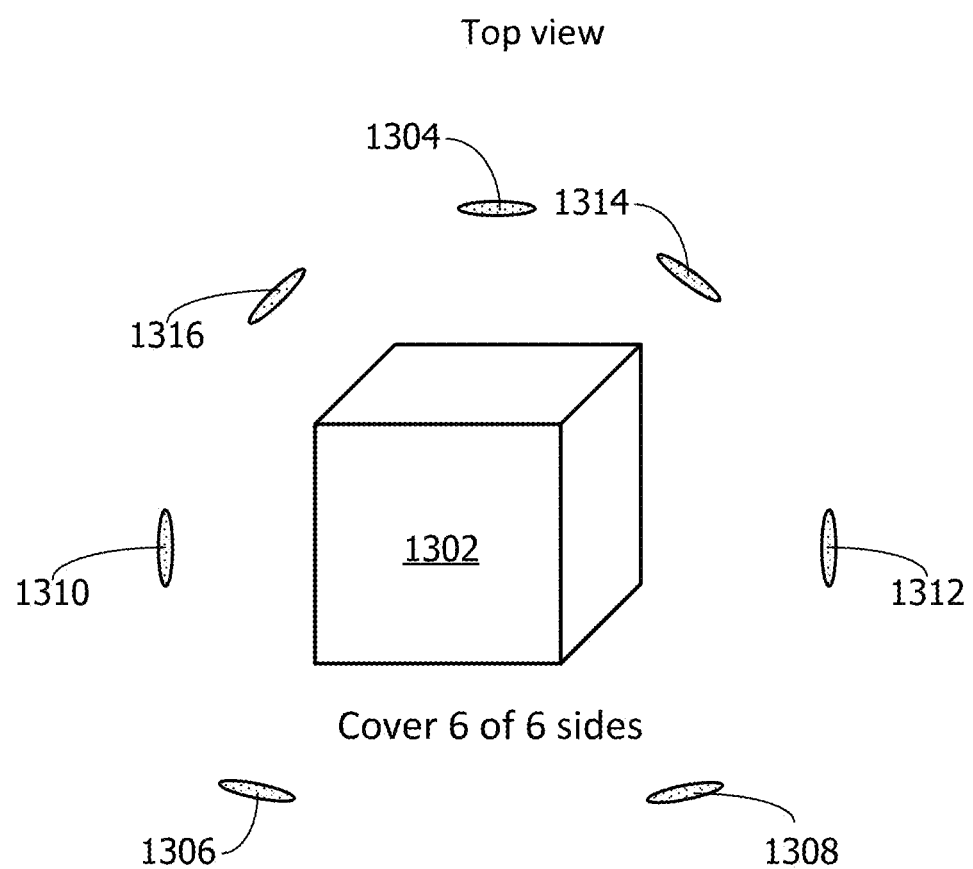
FIG. 13 is an exemplary block diagram illustrating a halo arrangement of sensor devices for capturing sensor data associated with an item.

FIG. 13 is an exemplary block diagram illustrating a halo arrangement of sensor devices for capturing sensor data associated with an item 1302. The halo arrangement of sensor devices in this example includes a first sensor device 1304 above the bagging area, a second sensor device 1306 and a third sensor device 1308 below the bagging area, a fourth sensor device 1310 at a first side of the bagging area, a fifth sensor device 1312 at a second (opposite) side of the bagging area, a sixth sensor device 1314 and a seventh sensor device 1316 positioned in a halo formation around the bagging area creating an item detection zone around the bagging area.

In the example of FIG. 13, the halo array of sensor devices includes seven sensor devices. However, the embodiments are not limited to seven sensor devices. In other embodiments, the halo array of sensor devices include any number of sensor devices. For example, the halo array of sensor devices includes eight sensor devices, twelve sensor devices, twenty sensor devices, five sensor devices, or any other number of sensor devices creating a detection zone substantially surrounding the bag support device(s) in the bagging area of the smart bagging station.

Figure 14:
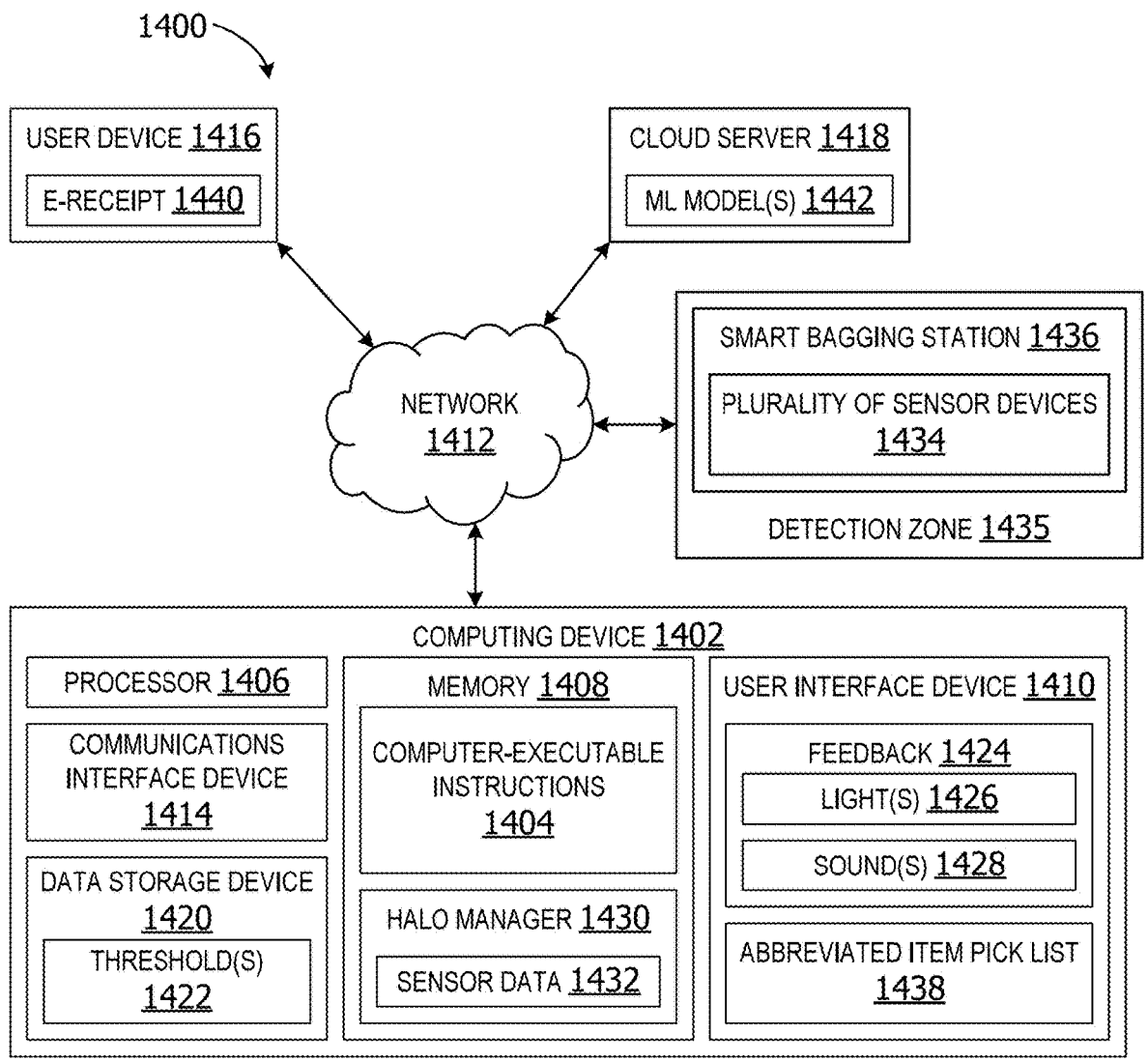
FIG. 14 is an exemplary block diagram illustrating a system for smart bagging via a halo sensor array.

Referring again to FIG. 14, an exemplary block diagram illustrates a system 1400 for smart bagging via a halo sensor array. In the example of FIG. 14, the computing device 1402 represents any device executing computer-executable instructions 1404 (e.g., as application programs, operating system functionality, or both) to implement the operations and functionality associated with the computing device 1402. The computing device 1402, in some embodiments includes a mobile computing device or any other portable device. A mobile computing device includes, for example but without limitation, a mobile telephone, laptop, tablet, computing pad, netbook, gaming device, and/or portable media player. The computing device 1402 can also include less-portable devices such as servers, desktop personal computers, kiosks, or tabletop devices. Additionally, the computing device 1402 can represent a group of processing units or other computing devices.

In some embodiments, the computing device 1402 has at least one processor 1406 and a memory 1408. The computing device 1402, in other embodiments includes a user interface device 1410.

The processor 1406 includes any quantity of processing units and is programmed to execute the computer-executable instructions 1404. The computer-executable instructions 1404 are performed by the processor 1406, performed by multiple processors within the computing device 1402 or performed by a processor external to the computing device 1402. In some embodiments, the processor 1406 is programmed to execute instructions such as those illustrated in the figures (e.g., FIG. 16, FIG. 17, FIG. 18, FIG. 19, and FIG. 20).

The computing device 1402 further has one or more computer-readable media such as the memory 1408. The memory 1408 includes any quantity of media associated with or accessible by the computing device 1402. The memory 1408 in these examples is internal to the computing device 1402 (as shown in FIG. 14). In other embodiments, the memory 1408 is external to the computing device (not shown) or both (not shown). The memory 1408 can include read-only memory and/or memory wired into an analog computing device.

The memory 1408 stores data, such as one or more applications. The applications, when executed by the processor 1406, operate to perform functionality on the computing device 1402. The applications can communicate with counterpart applications or services such as web services accessible via a network 1412. In an example, the applications represent downloaded client-side applications that correspond to server-side services executing in a cloud.

In other embodiments, the user interface device 1410 includes a graphics card for displaying data to the user and receiving data from the user. The user interface device 1410 can also include computer-executable instructions (e.g., a driver) for operating the graphics card. Further, the user interface device 1410 can include a display (e.g., a touch screen display or natural user interface) and/or computer-executable instructions (e.g., a driver) for operating the display. The user interface device 1410 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 1402 in one or more ways.

The network 1412 is implemented by one or more physical network components, such as, but without limitation, routers, switches, network interface cards (NICs), and other network devices. The network 1412 is any type of network for enabling communications with remote computing devices, such as, but not limited to, a local area network (LAN), a subnet, a wide area network (WAN), a wireless (Wi-Fi) network, or any other type of network. In this example, the network 1412 is a WAN, such as the Internet. However, in other embodiments, the network 1412 is a local or private LAN.

In some embodiments, the system 1400 optionally includes a communications interface device 1414. The communications interface device 1414 includes a network interface card and/or computer-executable instructions (e.g., a driver) for operating the network interface card. Communication between the computing device 1402 and other devices, such as but not limited to a user device 1416 and/or a cloud server 1418, can occur using any protocol or mechanism over any wired or wireless connection. In some embodiments, the communications interface device 1414 is operable with short range communication technologies such as by using near-field communication (NFC) tags.

The user device 1416 represents any device executing computer-executable instructions. The user device 1416 can be implemented as a mobile computing device, such as, but not limited to, a wearable computing device, a mobile telephone, laptop, tablet, computing pad, netbook, gaming device, and/or any other portable device. The user device 1416 includes at least one processor and a memory.

The user device 1416 can also include a user interface device. The cloud server 1418 is a logical server providing services to the computing device 1402 or other clients, such as, but not limited to, the user device 1416. The cloud server 1418 is hosted and/or delivered via the network 1412. In some non-limiting examples, the cloud server 1418 is associated with one or more physical servers in one or more data centers. In other embodiments, the cloud server 1418 is associated with a distributed network of servers.

The system 1400 can optionally include a data storage device 1420 for storing data, such as, but not limited to, one or more threshold(s) 1422. The one or more threshold(s) 1422 include user-configurable threshold values used by a halo manager 1430 to determine whether to generate feedback 1424 associated with whether an item placed into a bag is successfully scanned and/or whether the item is successfully identified using the sensor data 1432 generated by a plurality of sensor devices 1434 associated with a smart bagging station 1436. The smart bagging station 1436 is a bagging station having a halo sensor array for automatically detecting items passing through a detection zone 1435 of the plurality of sensor devices 1434, such as, but not limited to, the smart bagging station 100 in FIG. 1, the smart bagging station 200 in FIG. 2, the smart bagging station 300 in FIG. 3, the smart bagging station 400 in FIG. 4, the smart bagging station 600 in FIG. 6, and the smart bagging station 800 in FIG. 8.

The data storage device 1420 can include one or more different types of data storage devices, such as, for example, one or more rotating disks drives, one or more solid state drives (SSDs), and/or any other type of data storage device. The data storage device 1420 in some non-limiting examples includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other embodiments, the data storage device 1420 includes a database.

The data storage device 1420 in this example is included within the computing device 1402, attached to the computing device, plugged into the computing device, or otherwise associated with the computing device 1402. In other embodiments, the data storage device 1420 includes a remote data storage accessed by the computing device via the network 1412, such as a remote data storage device, a data storage in a remote data center, or a cloud storage.

The memory 1408 in some embodiments stores one or more computer-executable components, such as, but not limited to, the halo manager 1430. The halo manager 1430, when executed by the processor 1406 of the computing device 1402, obtains a first set of sensor data from a first set of sensor devices positioned in a curved arrangement within a recessed sensor device housing adjacent to a bagging device. The first set of sensor data includes sensor devices, such as, but not limited to, an RFID tag reader generating RFID tag data associated with items entering the detection zone 1435. The detection zone can include a shopping cart or shopping basket placed on or near the smart bagging station. In other words, items within a shopping cart or a shopping basket can be included within the detection zone surrounding the smart bagging station or a portion of the smart bagging station 1436, such that the halo manager 1430 can detect items in a shopping cart which are not bagged or remain the shopping cart or basket without being removed for scanning during checkout. In this manner, the system can detect unscanned items to prevent shrink due to any inadvertent failure to scan all items. The first set of sensor devices can also include one or more barcode scanners within a recessed sensor device housing generating barcode data associated with an item passing through a barcode scanning zone above the bagging device. The halo manager 1430 obtains a second set of sensor data from a second set of sensor devices removably attached to a top portion of a vertical sensor device support member. The second set of sensor devices, in some embodiments, are positioned above the bagging device(s). The second set of sensor devices, in this example, includes an image capture device generating images of objects within the detection zone 1435 and a second RFID tag reader generating RFID tag data associated with items within the detection zone 1435.

In some embodiments, the halo manager obtains a third set of sensor data from a third set of sensor devices located below the bagging device. The third set of sensor devices comprising a weight sensor. The halo manager 1430 analyzes the first set of sensor data, the second set of sensor data and the third set of sensor data to identify an item placed into a storage container associated with the bagging device. In some embodiments, the sensor data is analyzed by one or more machine learning (ML) model(s) 1442. The ML model(s) in this example are located on the cloud server 1418. The halo manager 1430 obtains the analysis results from the ML model(s) 1442. The results include item detections and recognition (identification). In other embodiments, the halo manager 1430 includes the one or more ML model(s) 1442 implemented on the computing device 1402. In these embodiments, the analysis results are generated by the halo manager 1430 rather than obtaining the results via the network 1412.

The halo manager 1430, in some embodiments, stores item identification data, including a predicted identification of each item placed into the storage container of the smart bagging station 1436. In other embodiments, the halo manager 1430 analyzes image data generated by a plurality of image capture devices using the one or more ML model(s) 1442, including one or more trained computer vision (CV) item detection and recognition models to identify a category of the item. The halo manager 1430 generates an abbreviated item pick list 1438 using the category of the item placed into the bag or other storage container. The halo manager 1430 presents (surfaces) the abbreviated item pick list 1438 via a user interface device, such as, but not limited to, the user interface device 1410.

In other embodiments, the halo manager 1430 generates a prompt requesting a user to identify the item from a list of possible items in the abbreviated item pick list 1438. The halo manager 1430 surfaces the prompt via the user interface device 1410. The halo manager 1430 adds the item to a digital cart list (cart inventory) associated with the smart bagging station in response to receiving a selection of the identification of the item from the abbreviated item pick list. When the system completes scanning of all items and all items are added to the digital cart, the user completes purchase of the items. The smart bagging station 1436 provides a receipt. In these embodiments, the halo manager 1430 generates an e-receipt 1440, including a list of all the items bagged and purchased via the smart bagging station. The e-receipt is transmitted to a user device 1416 via the network 1412.

In other embodiments, the halo manager 1430 analyzes sensor data 1432 obtained from the plurality of sensor devices 1434 in accordance with a task-based hierarchy of preferences. The halo manager 1430 analyzes data from different sensor devices in accordance with the task to be performed. For example, if the task is identifying an item that was placed into a bag, the system prioritizes RFID tag data from one or more RFID readers. If there is no RFID tag data available or if analysis of the RFID tag data fails to enable positive identification of the item, the halo manager 1430 utilizes barcode data from one or more barcode readers, such as UPC barcode readers reading UPC data on one or more items.

In some embodiments, the halo manager 1430 analyzes RFID tag data from at least one RFID tag reader in the plurality of sensor devices to identify the item first. The halo manager 1430 analyzes digital watermark data obtained from scanning a digital watermark associated with the item to identify the item in response to a failure to identify the item using the RFID tag data second. The halo manager 1430 analyzes universal product code (UPC) data obtained from reading a UPC by at least one barcode reader in the plurality of sensor devices to identify the item in response to a failure to identify the item using the digital watermark data. The halo manager 1430 then analyzes image data obtained from a plurality of image capture devices to identify the item in response to a failure to identify the item using the UPC data. The halo manager 1430 analyzes weight data associated with the item obtained from a weight sensor in response to a failure to identify the item using the image data.

In other embodiments, the halo manager 1430 analyzes image data obtained from a plurality of image capture devices first to identify an object within the detection zone, such as where the system is attempting to determine whether all items in a shopping cart were scanned and included in the e-receipt 1440. The halo manager 1430 analyzes RFID tag data from at least one RFID tag reader in the plurality of sensor devices to identify the item in response to a failure to identify the object using the image data. The halo manager 1430 analyzes digital watermark data obtained from scanning a digital watermark associated with the item to identify the item in response to a failure to identify the object using the RFID tag data. The halo manager 1430 analyzes UPC data obtained from reading a UPC by at least one barcode reader in the plurality of sensor devices to identify the object in response to a failure to identify the object using the digital watermark data. The halo manager 1430 analyzes weight data associated with the object obtained from a weight sensor in response to a failure to identify the object using the digital watermark data.

In still other embodiments, the halo manager 1430 generates issue-specific feedback 1424 in response to failure to successfully add an item placed into the storage container to a digital cart associated with the smart bagging station. The issue-specific feedback includes color-coded visual feedback, such as colored light(s) 1426. A first color indicator is generated to indicate a first type of issue, and a second color indicator is generated to identify a second type of issue. For example, failure to identify a bagged item may be indicated with a yellow light, successful identification of a bagged item may be indicated with a green light, and an age-restricted item requiring a check of the customer's identification may be indicated with an orange light. The issue-specific feedback is presented to the user via a user interface device, such as the user interface device 1410. In other embodiments, the colored lights are generated via an indicator light bar integrated into the smart bagging area rather that outputting the colored lights via the user interface device.

In other embodiments, the halo manager 1430 generates issue-specific feedback 1424 in response to failure to successfully add an item placed into the storage container to a digital cart associated with the smart bagging station. The issue-specific feedback includes audio feedback, such as one or more unique and audible sound(s) 1428.

In some embodiments, a first sound is generated to identify a failure to identify an item, a second (different) sound is generated to identify an age restriction associated with the item, and a third sound (different from the first sound and second sound) is generated to identify a maximum quantity limit associated with the item. In this manner, a customer can determine the nature of a problem occurring during bagging of the items at the smart bagging station 1436 without looking at the user interface device 1410. The customer or other user can tell from the sound emitted by the user interface device 1410 whether an item is successfully identified by the halo manager 1430 or not.

In other embodiments, the user can also determine whether an item has a quantity limit, age-restriction, a quantity number for produce is required to be entered by the user, an item failed to be recognized, there is a mechanical fault (error) with the unit, or other issue associated with it based on the sound and/or light(s) 1426 output by the user interface device 1410. For example, if the system needs the user to enter a number of pineapples being purchased by the user, the system 1400 can emit a specific sound, graphical icon and/or color light that is used to indicate that a quantity number for produce is required. When hearing this sound, the user knows that a quantity number should be provided via the user interface device. A different sound, graphical icon, and/or different color light is emitted when an item being purchased by the user has an age-restriction associated with it.

In other embodiments, the feedback can include a steady light or a flashing light. The color of the light and/or the speed with which the light flashes can be programmed to convey additional information to the user. In this manner, users in the area of the smart bagging station can quickly and easily identify a type of issue and/or determine what type of action may be required to resolve the issue without looking at the user interface display device (screen) and/or without reading any text displayed on the screen.

In some embodiments, the system 1400 enables identification of items (products) through bagging. Shrink detection is enabled via weight where no item is recognized but he weight of one of the bags is increased. An abbreviated item pick list provides possible produce items and is presented to the customer, where the weight change from the previous operation is used as the produce weight. In this manner, items are identified during bagging of items without having to orient and re-orient the items to accommodate the placement of a specific scanner to read the UPC. If other attempts at identifying an item are unsuccessful, the system prompts the user to use the hand scanner for serial numbers. In this example, the user interface device is used to prompt the user for this action. The system also optionally uses high-speed scanning with multi-signal technology to expedite the checkout process by leveraging natural human motion and reducing touchpoints during checkout to a single touchpoint (removal of item from cart and placement into a bag). This leverages a customers' natural desire to bag as they want. As that activity happens, items are passed through a detection zone created by the "halo" of scanners associated with the bagging area. The halo sensor array utilizes multiple signals to detect UPCs, digital watermarks, RFID tags, and weight, while capturing item images for CV item identification.

Figure 15:
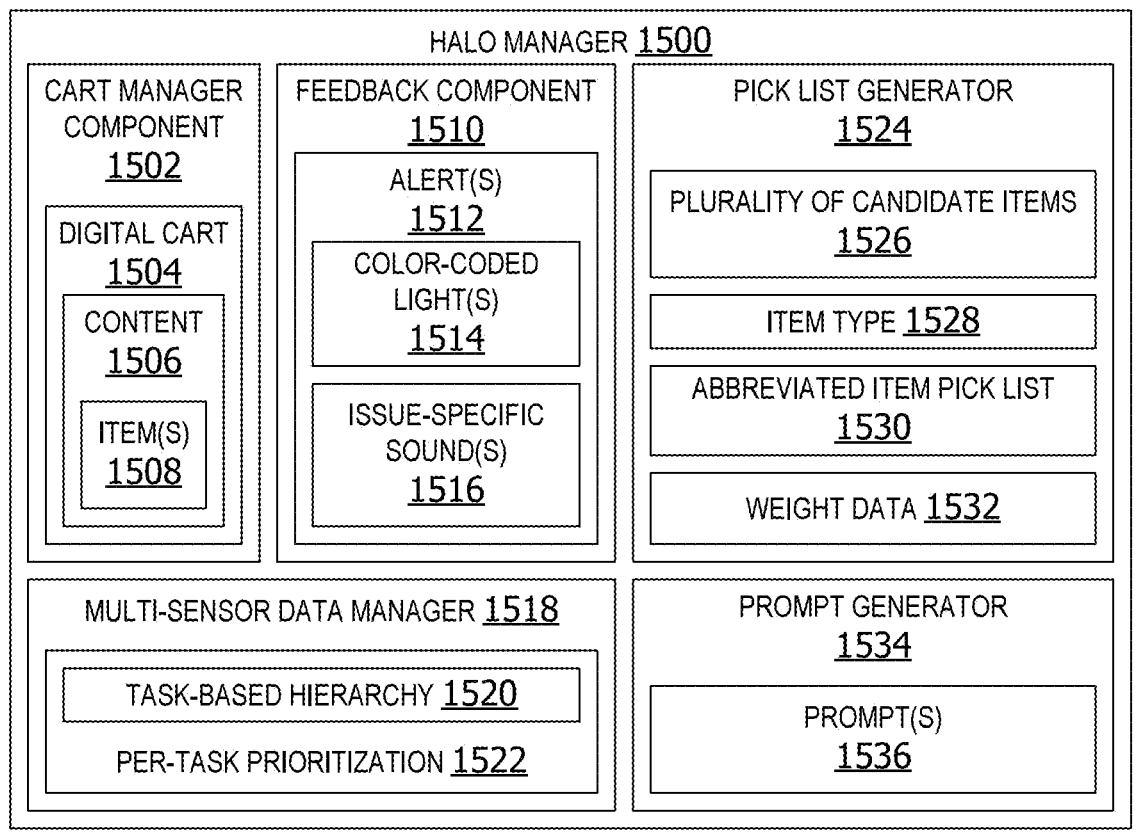
FIG. 15 is an exemplary block diagram illustrating a halo manager for managing sensor data from a plurality of different sensor devices associated with a smart bagging station.

FIG. 15 is an exemplary block diagram illustrating a halo manager 1500 for managing sensor data from a plurality of different sensor devices associated with a smart bagging station, such as, but not limited to, the halo manager 1430 in FIG. 14. In some embodiments, a cart manager component 1502 manages a digital cart 1504. The digital cart 1504 is a digital cart associated with the smart bagging station. The digital cart contents 1506 includes an inventory of each of the one or more item(s) 1508 detected and recognized by the halo manager 1500. In other words, as each item placed into a bag or other storage container is identified, the system adds the identified item to the digital cart contents 1506.

A feedback component 1510, in some embodiments, generates one or more alert(s) 1512 in response to an issue (problem) occurring during bagging of items at the smart bagging station and/or an action is required to be performed before bagging additional items can continue. The alert(s) 1512 include color-coded light(s) 1514 and/or issue-specific sound(s) 1516, The issue-specific sound(s) 1516 are emitted via a speaker device, such as, but not limited to, the one or more speaker(s) 144 in FIG. 1. The color-coded light(s) are emitted via a display device, such as, but not limited to, the display device 142 in FIG. 1.

In other embodiments, the halo manager 1500 includes a multi-sensor data manager 1518. The multi-sensor data manager 1518 performs per-task prioritization 1522 of usage of different types of sensor data based on a task-based hierarchy 1520. For example, if the task is identifying an item placed into a bag, the task-based hierarchy 1520 can include a prioritization of RFID tag data over image data. If the task is identifying an item at the bottom of a shopping cart that was not bagged, the system can prioritize image data over RFID tag data.

A pick list generator 1524, in some embodiments, is a component for generating an abbreviated item pick list 1530 for presentation to a user when an item on a product scale needs to be identified. In some cases, a plurality of candidate items 1526 is filtered based on an item type 1528. For example, if the item type is a type of produce that fits on a small produce scale and image data indicates the item is red, the system filters the plurality of candidate items 1526 to include red-colored items, such as apples, pomegranates, cherries, etc. In another embodiment, if an item on a produce scale is yellow, the system may utilize image data to determine the item is most likely organic bananas based on a color of a sticker label on the item. The system generates an abbreviated item pick list 1530 that includes the organic bananas, while eliminating other less-likely produce items, such as melons, green vegetables, etc. The halo manager 1500 in some embodiments places a predicted item name and/or image at the top of the list or in a prominent position. In this example, if the system predicts the item is a bunch of organic bananas, the identification of the organic bananas is displayed at the top of the abbreviated item pick list 1530 and/or displayed in a prominent manner, such as in larger font, highlighted, etc. In this example, the abbreviated item pick list is generated using one or more ML models to predict one or more possible identifications of an item on a product scale based on sensor data associated with the item, such as weight data 1532 and/or image data.

A prompt generator 1534, in some embodiments, generates one or more prompt(s) 1536 when user input is required. For example, if a quantity of items is required or if a selection of an item identification from an abbreviated item pick list is needed, the system generates one or more prompt(s) 1536 which are surfaced via the user interface.

Figure 16:
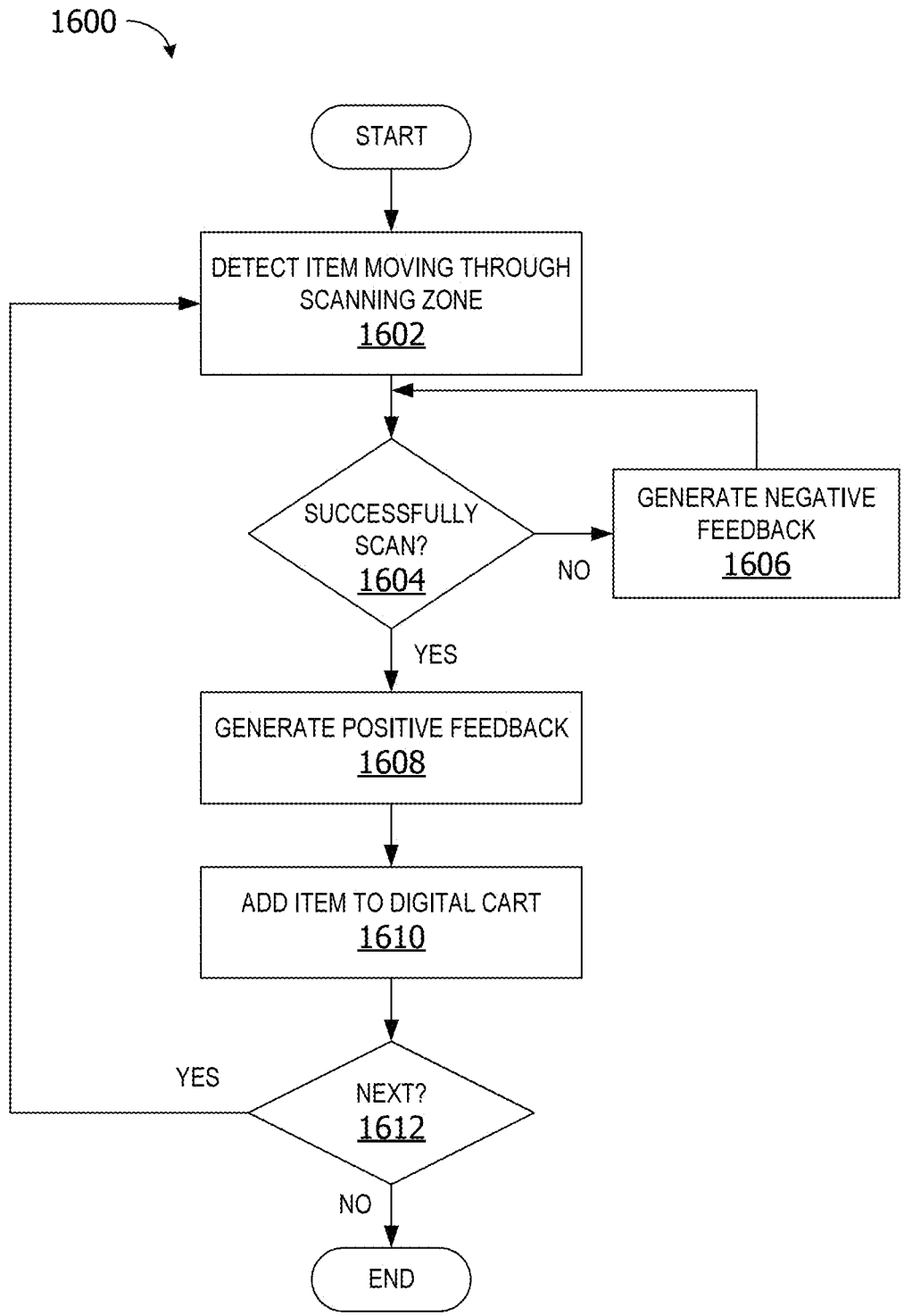
FIG. 16 is an exemplary flow chart illustrating operation of the computing device to detect items passing through a scanning zone and manage a digital cart associated with the smart bagging station.

FIG. 16 is an exemplary flow chart illustrating operation of the computing device to detect items passing through a scanning zone and manage a digital cart associated with the smart bagging station. The process 1600 shown in FIG. 16 is performed by a halo manager component, executing on a computing device, such as the computing device 1402 or the user device 1416 in FIG. 1.

The process begins by detecting an item moving through a scanning zone at 1602. The scanning zone includes a range of one or more sensors within a plurality of sensors in a halo sensor array, such as, but not limited to, the halo sensor array 102 in FIG. 1. A determination is made whether the scan is successful at 1604. The scan is successful if the item is identified using the sensor data generated by the sensor devices. If not, negative feedback is generated at 1606. The negative feedback prompts the user to move the item through the scanning zone again, in some embodiments. If the scan is successful, positive feedback is generated at 1608. The positive feedback and negative feedback includes color-coded lights and/or issue-specific sounds. The item is added to a digital cart at 1610. A determination is made whether a next item is detected in the scanning zone at 1612. If yes, the process iteratively executes operations 1602 through 1610 until all items are scanned, identified, and added to the digital cart at 1610. When a next item is not detected, the process terminates thereafter.

While the operations illustrated in FIG. 16 are performed by a computing device, aspects of the disclosure contemplate performance of the operations by other entities. In a non-limiting example, a cloud service performs one or more of the operations. In another embodiment, one or more computer-readable storage media storing computer-readable instructions may execute to cause at least one processor to implement the operations illustrated in FIG. 16.

Figure 17:
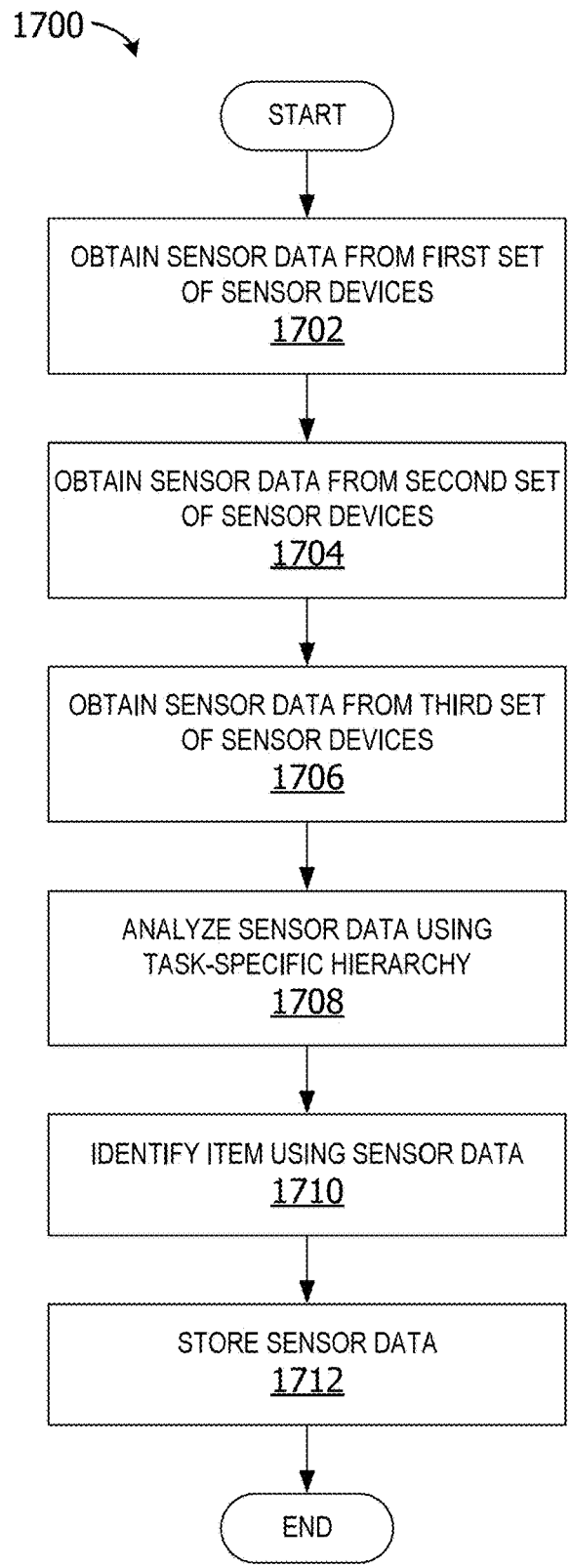
FIG. 17 is an exemplary flow chart illustrating operation of the computing device to managing a plurality of different types of sensor devices within a halo sensor array.

FIG. 17 is an exemplary flow chart illustrating operation of the computing device to managing a plurality of different types of sensor devices within a halo sensor array. The process 1700 shown in FIG. 17 is performed by a halo manager component, executing on a computing device, such as the computing device 1402 or the user device 1416 in FIG. 1.

The process begins by obtaining sensor data from a first set of sensor devices at 1702. The first set of sensor devices include devices, such as, but not limited to, the sensor devices in the halo sensor array 102 in FIG. 1. The halo manager obtains sensor data from a second set of sensor devices at 1704. The halo manager 1500 obtains sensor data from a third set of sensor devices at 1706. In some embodiments, the first set of sensor devices, the second set of sensor devices and the third set of sensor devices are located at different locations around the bagging area. The halo manager 1500 analyzes the sensor data using a task-specific hierarchy at 1708. Different types of sensor data are prioritized depending on the task that is being performed. The halo manager 1500 identifies an item using the sensor data obtained from the sensor devices at 1710. The sensor data is stored at 1712. In some embodiments, the sensor data is stored in a data storage device, such as, but not limited to, the data storage device 1420 in FIG. 14. The process terminates thereafter.

While the operations illustrated in FIG. 17 are performed by a computing device, aspects of the disclosure contemplate performance of the operations by other entities. In a non-limiting example, a cloud service performs one or more of the operations. In another embodiment, one or more computer-readable storage media storing computer-readable instructions may execute to cause at least one processor to implement the operations illustrated in FIG. 17.

Figure 18:
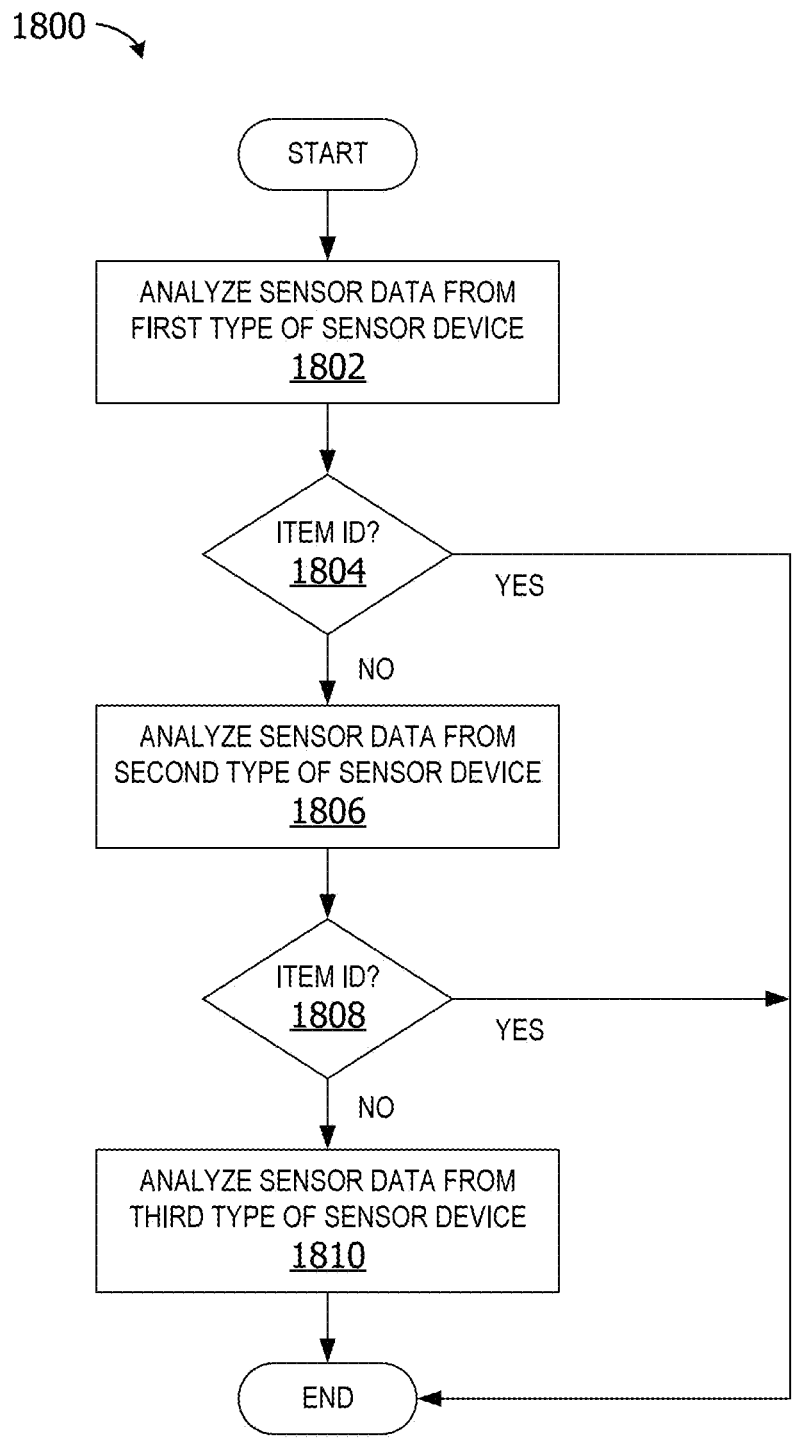
FIG. 18 is an exemplary flow chart illustrating operation of the computing device to identify an item using sensor data from different types of sensor devices within a halo sensor array of a smart bagging device.

FIG. 18 is an exemplary flow chart illustrating operation of the computing device to identify an item using sensor data from different types of sensor devices within a halo sensor array of a smart bagging device. The process 1800 shown in FIG. 18 is performed by a halo manager component, executing on a computing device, such as the computing device 1402 or the user device 1416 in FIG. 1.

The process begins by analyzes sensor data for a first type of sensor device at 1802. A determination is made to determine whether an item is identifies at 1804. If yes, the process terminates thereafter. If the item is not identified, the halo manager analyzes sensor data from a second type of sensor device in the halo sensor array at 1806. A determination is made whether the item is identified using sensor data from the second type of sensor device at 1808. If yes, the process terminates thereafter. If not, the halo manager analyzes sensor data from a third type of sensor data at 1810. The process terminates thereafter.

While the operations illustrated in FIG. 18 are performed by a computing device, aspects of the disclosure contemplate performance of the operations by other entities. In a non-limiting example, a cloud service performs one or more of the operations. In another embodiment, one or more computer-readable storage media storing computer-readable instructions may execute to cause at least one processor to implement the operations illustrated in FIG. 18.

Figure 19:
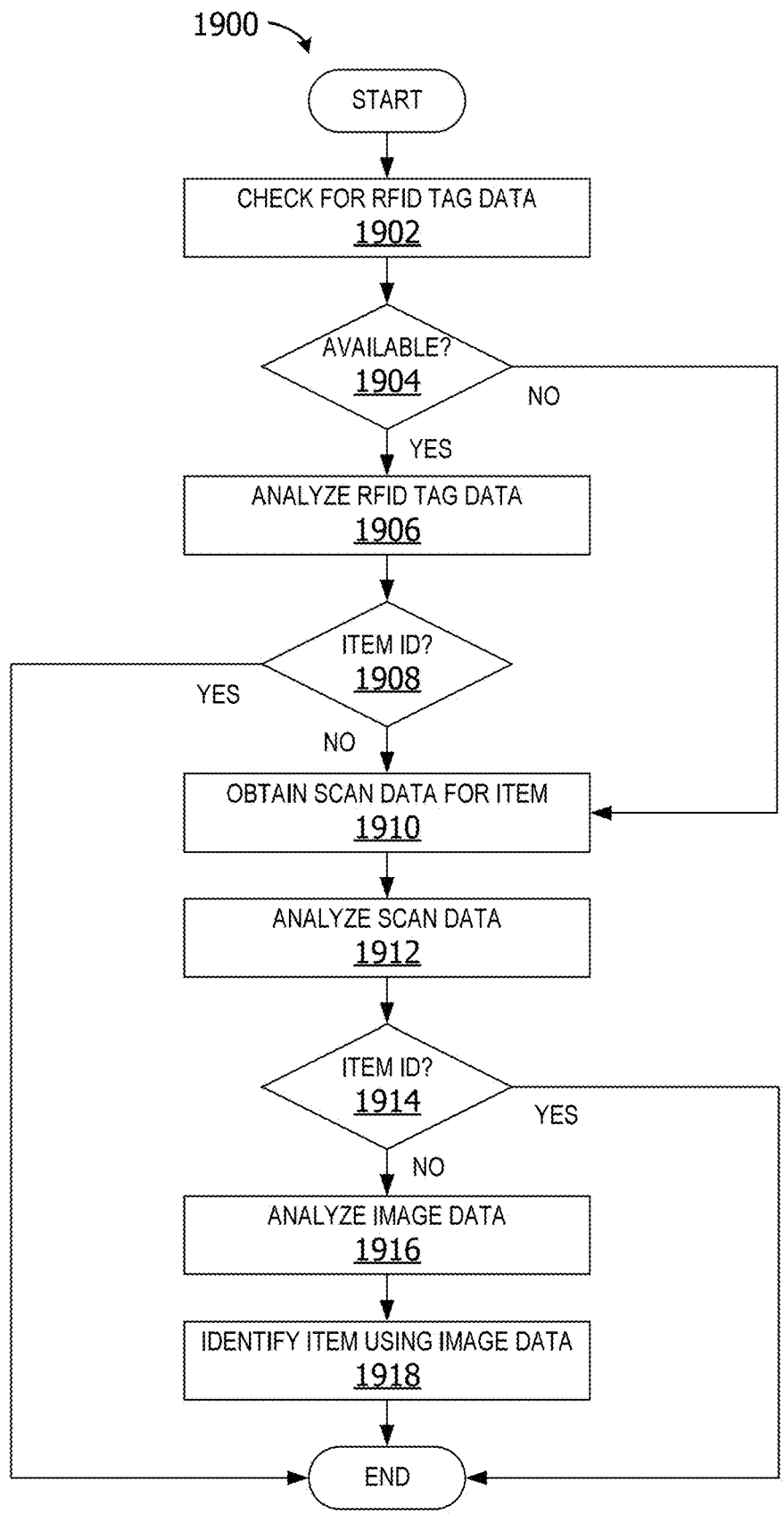
FIG. 19 is an exemplary flow chart illustrating operation of the computing device to identify an item using a task-based hierarchy for prioritizing use different types of sensor data.

FIG. 19 is an exemplary flow chart illustrating operation of the computing device to identify an item using a task-based hierarchy for prioritizing use different types of sensor data. The process 1900 shown in FIG. 19 is performed by a halo manager component, executing on a computing device, such as the computing device 1402 or the user device 1416 in FIG. 1.

The process begins by checking for RFID tag data at 1902. The halo manager checks for RFID tag data in the sensor data obtained from the halo sensor array. The sensor data is data such as, but not limited to, sensor data 1432 in FIG. 14. A determination is made whether RFID tag data is available from the sensor devices at 1904. If yes, the RFID tag data is analyzed at 1906. A determination is made whether an item is identified at 1908. If yes, the process terminates thereafter.

If the item is not identified at 1908, scan data is obtained for an item at 1910. The scan data is analyzed at 1912. A determination is made whether the item is identified using the scan data at 1914. If yes, the process terminates thereafter.

If the item is not identified at 1914, image data is analyzed at 1916. The image data is used to identify the item at 1918. The process terminates thereafter.

While the operations illustrated in FIG. 19 are performed by a computing device, aspects of the disclosure contemplate performance of the operations by other entities. In a non-limiting example, a cloud service performs one or more of the operations. In another embodiment, one or more computer-readable storage media storing computer-readable instructions may execute to cause at least one processor to implement the operations illustrated in FIG. 19.

Figure 20:
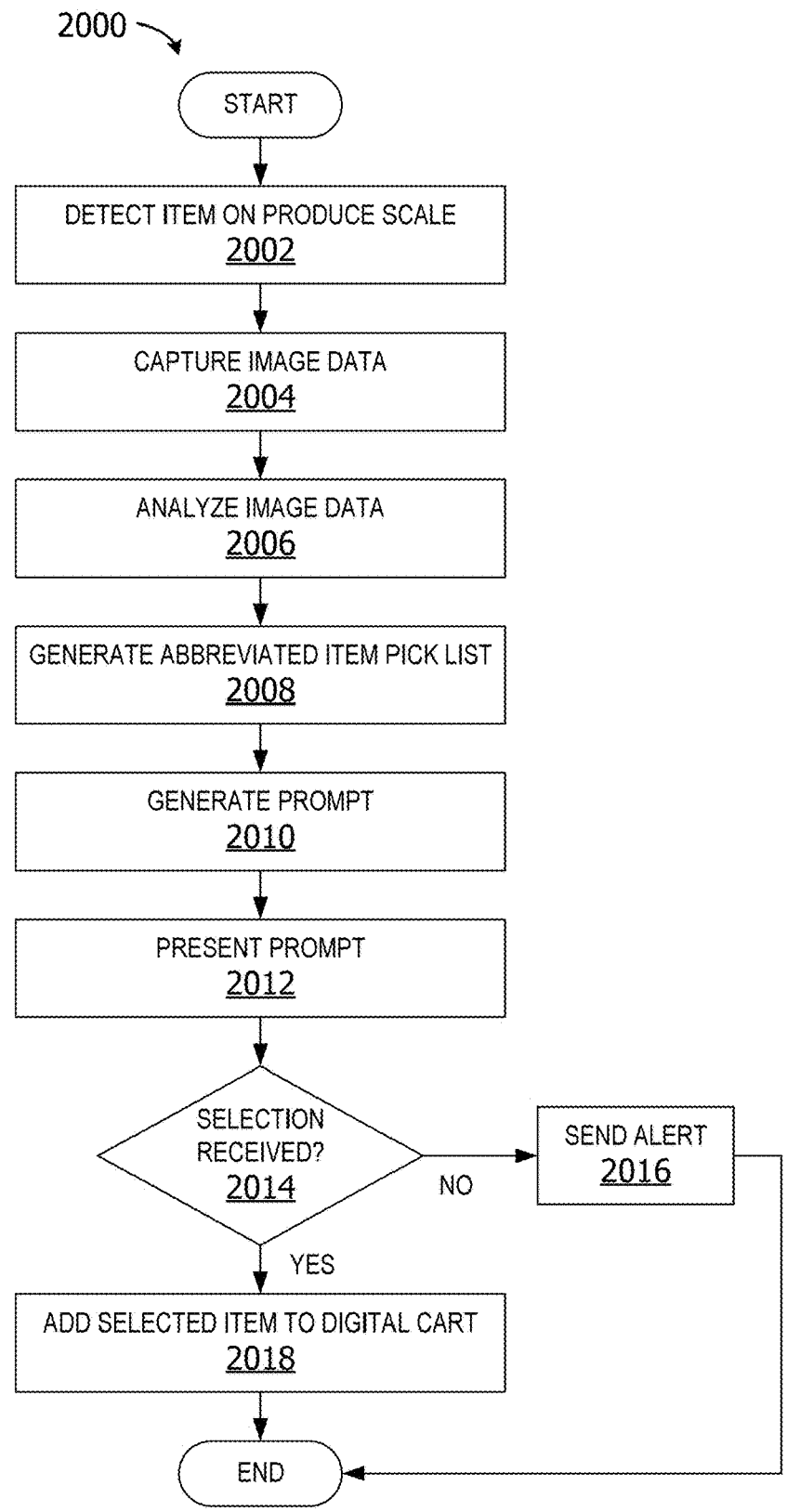
FIG. 20 is an exemplary flow chart illustrating operation of the computing device to provide an abbreviated item pick list for identifying an item.

FIG. 20 is an exemplary flow chart illustrating operation of the computing device to provide an abbreviated item pick list for identifying an item. The process 2000 shown in FIG. 20 is performed by a halo manager component, executing on a computing device, such as the computing device 1402 or the user device 1416 in FIG. 1.

The process begins by detecting an item on a produce scale at 2002. Image data is captured at 2004. The image data is obtained from one or more image capture devices, such as the image capture device(s) 128 in FIG. 1. The image data is analyzed at 2006. An abbreviated item pick list is generated at 2008. A prompt is generated at 2010. The prompt is a prompt to select an item from the list, such as, but not limited to, the prompt(s) 1536 at FIG. 15. The prompt is presented at 2012. In some embodiments, the prompt is presented via the user interface device, such as, but not limited to, the user interface device 140 in FIG. 1. A determination is made whether an item is selected from the abbreviated item pick list at 2014. If not, an alert is sent at 2016. The alert is an alert or notification sent to a user indicating a failure to obtain an identification of an item on the product scale. The process terminates thereafter.

If a selection is received at 2014, the selected item is added to the digital cart at 2018. The process terminates thereafter.

While the operations illustrated in FIG. 20 are performed by a computing device, aspects of the disclosure contemplate performance of the operations by other entities. In a non-limiting example, a cloud service performs one or more of the operations. In another embodiment, one or more computer-readable storage media storing computer-readable instructions may execute to cause at least one processor to implement the operations illustrated in FIG. 20.

ADDITIONAL EXAMPLES

Some embodiments provide a system for single touch self-checkout where items are scanned automatically by multiple scanners as the customer places items into a bag (only a single touch for each item). The scanners include cameras, RFID tag readers, UPC scanner and/or weight scales under the bagging area. The system implements CV and/or machine learning ML algorithms to analyze images of the items being scanned and/or weighted. The CV and/or ML algorithms detect and recognize items, including types of items/variety of items. The ML algorithm continually matches the products weight in the bagging station with that of the product. The system comprises a user interface (UI) above the bagging area. The scanners provide visual and audible feedback to users indicating whether items are scanned correctly, incorrectly, or failed to scan and/or error. The audible feedback are different sound and different colored lights to inform users whether scans were completed accurately while the customer is scanning items and without requiring the customer to rescan the items. The system comprises a logic system which deduplicates multi-sensor readings for products having bar codes, RFID, and/or digital watermarks. When multiple sensors read the same product, the system uses RFID as primary, digital watermarks as secondary, and UPC as tertiary. The system utilizes a curved arrangement of sensors to recognize products.

In other embodiments, the system provides a single touch self-checkout in which a variety of sensor/scanner devices surrounding a bagging area/bag support device scans items as the customer places each item into a bag. The scanners include cameras, RFID tag readers, UPC scanners, weight scales under the bagging area, etc. Computer vision (CV) and machine learning (ML) is used to analyze images of the items being scanned and/or weighed. The CV and ML is used to detect and recognize items, including type of item/variety. The user interface above the bagging area and scanners provides visual and audible feedback to users indicating whether items are scanned correctly, scanned incorrectly, failed to scan, or if an error occurred. Different sounds and different colored lights are provided as feedback to inform users whether scans were completed accurately while the customer is scanning items and without requiring the customer to rescan items. A machine learning system will continually match a product's weight in the bagging station with that of the product. A logic system will deduplicate multi-sensor readings for products having bar codes, RFID, and digital watermarks. The system uses a curved arrangement of sensors to recognize products. When multiple sensors read the same product, the system uses RFID as primary, digital watermarks as secondary and UPC as a tertiary (third tier) source of sensor data for identifying the items being bagged. Bagging products without having to orient and re-orient them for a scanner to read the UPC is also novel.

The system, in some embodiments, provides a halo register integrating signals/data received from multiple different scanners, sensors, and cameras to identify items placed into shopping bags. The smart bagging station provides a single touch self-checkout where items are scanned automatically by a variety of scanners as the customer places items into a bag (only a single touch for each item). The system integrates lights and sounds for providing feedback to customers regarding success or failure of automatic item scans. CV and ML are leveraged to identify items and item varieties such that customers do not have select the item from a pick list. Haptics, including visual and audible alerts are provided via the UI. The halo of sensor devices (halo scanners) located around the bagging area (above, below and behind the bagging area) generates sensor data used to identify items when placed in bag(s).

The smart bagging station configuration, in some embodiments, allows the system to identify products as the customer places them into a bag. The system includes upward, downward, and sideways facing cameras which provide a field of view over the bagging area of the smart bagging station. In addition to the cameras, RFID sensors identify products as will digital watermarks (Digimarc®) via the cameras. Weight sensors in the bottom of the bagging area are used to verify the scans and for weighing produce. The scan table, in an example, can hold 8 to 12 bags of products.

A machine learning model, in some embodiments, continually matches a product's weight in the bagging station with that of the product. The halo manager deduplicates multi-sensor readings for products having bar codes, RFID, and digital watermarks.

The system allows a customer to simply move their products from their cart or tote into a bag at the halo bagging station. The system recognizes the products bagged. The system uses a curved arrangement of sensors to recognize products. When multiple sensors read the same product, the system uses RFID as primary, a digital watermark as secondary and UPC as tertiary. In an example scenario, the system uses RFID tag data first, the digital watermark data, and then UPC data to identify products. Thus, if the item cannot be identified using the RFID tag data, the system then attempts to identify the item using digital watermark data if any digital watermark is detected. Finally, UPC data is used to identify the product (item) if the RFID tag data and digital watermark data fails to enable confident prediction of the identification of the bagged product.

In some embodiments, the halo sensor array provides a near three hundred and sixty degree coverage of each item placed into a bag or other storage container. In some embodiments, the sensors in the halo sensor array have more than one hundred and eight degree range of coverage around an item passing through the scanning zone created by the sensors in the recessed sensor housing. This is by virtue of the semicircle arrangement of the sensors within the housing. The additional sensors outside the housing enable even greater coverage, such as two hundred and seventy degrees of coverage around each item.

In another embodiment, the sensor devices are able to generate data associated with a halo of coverage around each item which is between two hundred degrees and three hundred degrees, capturing information regarding the top of the item, the bottom of the item, the sides of the item, the front of the item that is facing the bagging device, and/or portions of the back of the item. For example, a camera on the vertical sensor device support and an RFID tag reader is able to capture information associated with the top of the item and RFID data for the item, the sensors in the sensor device housing gathers information about the front and sides of the item as the item passes through the scanning zone, and sensors beneath the bagging device(s) capture sensor data associated with any portion of the item which is facing downward towards the base of the bagging device(s).

Other embodiments provide a smart bagging station having a halo sensor array, the smart bagging station comprising a bagging device comprising a bag support member for supporting a storage container; a sensor device housing adjacent to the bagging device; a plurality of sensor devices in a halo configuration forming a detection zone encompassing the smart bagging station, wherein the plurality of sensor devices further comprises: a set of barcode readers positioned in a curved arrangement within the sensor device housing, the set of barcode readers generating barcode scan data associated with an item as the item passes through the scanning zone above the bagging device, the scanning zone comprising a threshold maximum scanning range of the barcode reader; a set of radio frequency identifier (RFID) tag readers comprising a first RFID tag reader located within the sensor device housing generating RFID tag data associated with the item as the item is placed into the storage container; and a set of image capture devices comprising a first image capture device removably attached to a fixture above the bagging device and a second image capture device located substantially beneath the bagging device, the set of image capture devices generating image data associated with a plurality of items within the detection zone.

Alternatively, or in addition to the other embodiments described herein, examples include any combination of the following:

analyze the image data generated by the set of image capture devices using a machine learning (ML) computer vision (CV) model to identify a category of the item;

generate an abbreviated item pick list using the category of the item;

present the abbreviated item pick list via a user interface device;

generate a prompt requesting the user to identify the item from a list of possible items in the abbreviated item pick list;

surface the prompt via the user interface device;

add the item to a digital cart associated with the smart bagging station in response to receiving a selection of an identification of the item from the abbreviated item pick list;

a second RFID tag reader removably attached to a top portion of a vertical sensor device support member, the set of RFID tag readers generating the RFID tag data associated with RFID tags within the detection zone;

a weight sensor beneath the bagging device, wherein the weight sensor generates weight data associated with a selected item placed into the storage container, wherein the weight data is used to confirm an identification of the selected item placed into the storage container;

a first barcode reader, a second barcode reader, a third barcode reader, and a fourth barcode reader in a semi-circle arrangement relative to a back member of the bagging device, wherein the set of barcode readers in the semicircle arrangement are located within the recessed sensor device housing;

analyze sensor data from the plurality of sensor devices in accordance with a task-based hierarchy of preference;

analyze a first type of the sensor data associated with a first type of sensor device in the plurality of sensor devices to identify the item;

analyze a second type of the sensor data associated with a second sensor device of a second type of sensor device in the plurality of sensor devices to identify the item in response to a failure to identify the item using the first type of sensor data;

analyze a third type of sensor data associated with a third type of sensor device in the plurality of sensor device to identify the item in response to the failure to identify the item using the second type of sensor data;

a plurality of image capture devices generating real-time image data associated with the plurality of items within the detection zone;

a plurality of barcode readers generating barcode data associated with a selected item in the plurality of items passing through the barcode scanning zone above the bagging device;

a plurality of RFID tag readers generating the RFID tag data associated with the plurality of items within the detection zone;

a plurality of weight sensors generating weight data, the plurality of weight sensors comprising a first weight sensor beneath the bagging device and a second weight sensor associated with a product scale;

obtaining a first set of sensor data from a first set of sensor devices positioned in a curved arrangement within a recessed sensor device housing adjacent to a bagging device, the first set of sensor data comprising RFID tag data generated by a first RFID tag reader in the first set of sensor devices and barcode data associated with an item passing through a barcode scanning zone above the bagging device generated by a set of barcode readers located within the recessed sensor housing;

obtaining a second set of sensor data from a second set of sensor devices removably attached to a top portion of a vertical sensor device support member, wherein the second set of sensor devices are positioned above the bagging device, the second set of sensor devices comprising an image capture device generating images of items within the detection zone and a second RFID tag reader generating RFID tag data associated with items within the detection zone;

obtaining a third set of sensor data from a third set of sensor devices located below the bagging device, the third set of sensor devices comprising a weight sensor;

analyzing the first set of sensor data, the second set of sensor data and the third set of sensor data to identify an item placed into a storage container associated with the bagging device;

storing an identification of the item placed into the storage container;

analyzing image data generated by a plurality of image capture devices using a machine learning (ML) computer vision (CV) model to identify a category of the item;

generating an abbreviated item pick list using the category of the item;

presenting the abbreviated item pick list via a user interface device;

generating a prompt requesting a user to identify the item from a list of possible items in the abbreviated item pick list;

surfacing the prompt via the user interface device;

adding the item to a digital cart associated with the smart bagging station in response to receiving a selection of the identification of the item from the abbreviated item pick list;

analyzing sensor data from a plurality of sensor devices in accordance with a task-based hierarchy of preference;

analyzing RFID tag data from at least one RFID tag reader in the plurality of sensor devices to identify the item;

analyzing digital watermark data obtained from scanning a digital watermark associated with the item to identify the item in response to a failure to identify the item using the RFID tag data;

analyzing universal product code (UPC) data obtained from reading a UPC by at least one barcode reader in the plurality of sensor devices to identify the item in response to a failure to identify the item using the digital watermark data;

analyze image data obtained from a plurality of image capture devices to identify the item in response to a failure to identify the item using the UPC data;

analyze weight data associated with the item obtained from a weight sensor in response to a failure to identify the item using the image data;

analyzing sensor data from a plurality of sensor devices in accordance with a task-based hierarchy of preference;

analyzing image data obtained from a plurality of image capture devices to identify an item within the detection zone;

analyzing RFID tag data from at least one RFID tag reader in the plurality of sensor devices to identify the item in response to a failure to identify the item using the image data;

analyzing digital watermark data obtained from scanning a digital watermark associated with the item to identify the item in response to a failure to identify the item using the RFID tag data;

analyzing universal product code (UPC) data obtained from reading a UPC by at least one barcode reader in the plurality of sensor devices to identify the item in response to a failure to identify the item using the digital watermark data;

analyzing weight data associated with the item obtained from a weight sensor in response to a failure to identify the item using the digital watermark data;

generating issue-specific feedback in response to failure to successfully add an item placed into the storage container to a digital cart associated with the smart bagging station, the issue-specific feedback comprising color-coded visual feedback, wherein a first color indicator is generated to indicate a first type of issue, and a second color indicator is generated to identify a second type of issue;

presenting the issue-specific feedback via a user interface device;

generating issue-specific feedback in response to failure to successfully add an item placed into the storage container to a digital cart associated with the smart bagging station, the issue-specific feedback comprising audio feedback, wherein a first sound is generated to identify a failure to identify an item, a second sound is generated to identify an age restriction associated with the item, and a third sound is generated to identify a maximum quantity limit associated with the item;

a vertical sensor device support member adjacent to the bagging device;

a plurality of sensor devices of a plurality of different sensor device types arranged in a halo configuration forming a detection zone around the bagging device, the detection zone comprising a threshold maximum sensor device range encompassing a bagging area associated with the smart bagging apparatus;

a first set of sensor devices positioned in a curved arrangement within the recessed sensor device housing, the first set of sensor devices generates sensor data associated with an item as the item passes through a scanning zone above the bagging device, the scanning zone comprising a threshold range of the first set of sensor devices;

a second set of sensor devices removably attached to a top portion of the vertical sensor device support member, wherein the second set of sensor devices are positioned above the bagging device, the second set of sensor devices comprising a first image capture device;

a third set of sensor devices below the bagging device;

a first radio frequency identifier (RFID) tag reader;

a first barcode reader, the first RFID tag reader generating RFID tag data associated with an item as the item is placed into the storage container, and wherein the first barcode reader generates scan data associated with the item as the item passes through a barcode scanning zone above the bagging device;

an RFID tag reader removably attached to a top portion of the vertical sensor device support member, the RFID tag reader generating RFID tag data associated with RFID tags within the detection zone;

a first UPC barcode reader at a first position of the curved arrangement, a second UPC barcode reader at a second position of the curved arrangement, a third UPC barcode reader at a third position, and a fourth UPC barcode reader in a fourth position of the curved arrangement within the recessed sensor device housing, wherein the first set of sensor devices form a semicircle configuration of sensor devices;

a first image capture device positioned above the bagging device, the first image capture device;

a second image capture device positioned below the bagging device;

a third image capture device within the recessed sensor device housing, wherein the image data generated by the first image capture device, the second image capture device, and the third image capture device are used to detect and read digital watermarks associated with items passing through the detection zone;

a user interface device, wherein the user interface device presents issue-specific feedback to a user as the user places items into the storage container of the bagging device, the issue-specific feedback comprising color-coded visual feedback, wherein a first color indicator is generated to indicate a failure to identify a selected item passing through the detection zone and a second color indicator is generated to identify an age restriction associated with the selected item;

a user interface device, wherein the user interface device presents an abbreviated item pick list and prompts a user to identify a selected item placed on a produce scale from the abbreviated item pick list, wherein the abbreviated item pick list is a curated list of possible item identifications for the selected item based on image data of the item generated by the plurality of sensor devices, wherein the item is added to a digital cart associated with the smart bagging apparatus in response to receiving a selection of the identification of the item from the abbreviated pick list.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, or an entity (e.g., processor 1406, web service, server, application program, computing device, etc.) not shown in F FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15.

In some embodiments, the operations illustrated in FIG. 16, FIG. 17, FIG. 18, FIG. 19, and FIG. 20 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other embodiments, a computer readable medium having instructions recorded thereon which when executed by a computer device cause the computer device to cooperate in performing a method of identifying items during bagging via a halo sensor array of a smart bagging station, the method comprising obtaining a first set of sensor data from a first set of sensor devices positioned in a curved arrangement within a recessed sensor device housing adjacent to a bagging device, the first set of sensor data comprising RFID tag data generated by a first RFID tag reader in the first set of sensor devices and barcode data associated with an item passing through a barcode scanning zone above the bagging device generated by a set of barcode readers located within the recessed sensor housing; obtaining a second set of sensor data from a second set of sensor devices removably attached to a top portion of a vertical sensor device support member, wherein the second set of sensor devices are positioned above the bagging device, the second set of sensor devices comprising an image capture device generating images of items within the detection zone and a second RFID tag reader generating RFID tag data associated with items within the detection zone; obtaining a third set of sensor data from a third set of sensor devices located below the bagging device, the third set of sensor devices comprising a weight sensor; analyzing the first set of sensor data, the second set of sensor data and the third set of sensor data to identify an item placed into a storage container associated with the bagging device; and storing an identification of the item placed into the storage container.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some embodiments, to a wireless local area network using high frequency radio signals for the transmission of data. The term "BLUETOOTH®" as used herein refers, in some embodiments, to a wireless technology standard for exchanging data over short distances using short wavelength radio transmission. The term "NFC" as used herein refers, in some embodiments, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other embodiments of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for identifying items as they are bagged at a smart bagging station having a halo sensor array. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, such as when encoded to perform the operations illustrated in FIG. 16, FIG. 17, FIG. 18, FIG. 19, and FIG. 20, constitute exemplary means for obtaining a first set of sensor data from a first set of sensor devices positioned in a curved arrangement within a recessed sensor device housing adjacent to a bagging device, the first set of sensor data comprising RFID tag data generated by a first RFID tag reader in the first set of sensor devices and barcode data associated with an item passing through a barcode scanning zone above the bagging device generated by a set of barcode readers located within the recessed sensor housing; obtaining a second set of sensor data from a second set of sensor devices removably attached to a top portion of a vertical sensor device support member, wherein the second set of sensor devices are positioned above the bagging device, the second set of sensor devices comprising an image capture device generating images of items within the detection zone and a second RFID tag reader generating RFID tag data associated with items within the detection zone; obtaining a third set of sensor data from a third set of sensor devices located below the bagging device, the third set of sensor devices comprising a weight sensor; analyzing the first set of sensor data, the second set of sensor data and the third set of sensor data to identify an item placed into a storage container associated with the bagging device; and storing an identification of the item placed into the storage container.

Other non-limiting examples provide one or more computer storage devices having a first computer-executable instructions stored thereon for providing automatic item scanning using a halo sensor array. When executed by a computer, the computer performs operations including obtaining sensor data from a halo sensor array; identifying items being bagged without manually scanning or re-orienting the items as they are bagged; and generating issue-specific feedback, including color-coded lights and/or issue-specific sounds.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or" as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to "A" only (optionally including elements other than "B"); in another embodiment, to B only (optionally including elements other than "A"); in yet another embodiment, to both "A" and "B" (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of 'A' and 'B'" (or, equivalently, "at least one of 'A' or 'B'," or, equivalently "at least one of 'A' and/or 'B'") can refer, in one embodiment, to at least one, optionally including more than one, "A", with no "B" present (and optionally including elements other than "B"); in another embodiment, to at least one, optionally including more than one, "B", with no "A" present (and optionally including elements other than "A"); in yet another embodiment, to at least one, optionally including more than one, "A", and at least one, optionally including more than one, "B" (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A smart bagging station having a halo sensor array, the smart bagging station comprising:
    a sensor device housing adjacent to a bagging device;
    a plurality of sensor devices in a halo configuration forming a detection zone encompassing the smart bagging station, wherein the plurality of sensor devices further comprises:
    a first set of sensor devices positioned in a curved arrangement within the sensor device housing, the set of sensor devices generating sensor data associated with an item as the item passes through a scanning zone of the first set of sensor devices substantially above the bagging device;
    a second set of sensor devices generating sensor data associated with the item as the item is placed into a storage container associated with the bagging device; and
    a set of image capture devices generating image data associated with a plurality of items within the detection zone.

2. The smart bagging station of claim 1, the smart bagging station further comprising:
    a processor; and
        a computer-readable medium storing a halo manager component that is operative upon execution by the processor to:
    analyze the image data generated by the set of image capture devices using a machine learning (ML) computer vision (CV) model to identify a category of the item;
    generate an abbreviated item pick list using the category of the item;
    present the abbreviated item pick list via a user interface device;
    generate a prompt requesting the user to identify the item from a list of possible items in the abbreviated item pick list;
    surface the prompt via the user interface device; and
    add the item to a digital cart associated with the smart bagging station in response to receiving a selection of an identification of the item from the abbreviated item pick list.

3. The smart bagging station of claim 1, further comprising:
    a RFID tag reader removably attached to a top portion of a vertical sensor device support member, the RFID tag reader generating RFID tag data associated with RFID tags within the detection zone.

4. The smart bagging station of claim 1, further comprising:
    a weight sensor beneath the bagging device, wherein the weight sensor generates weight data associated with a selected item placed into the storage container, wherein the weight data is used to confirm an identification of the selected item placed into the storage container.

5. The smart bagging station of claim 1, wherein the set of sensor devices further comprises:
    a first barcode reader, a second barcode reader, a third barcode reader, and a fourth barcode reader in a semicircle arrangement relative to a back member of the bagging device, wherein the set of barcode readers in the semicircle arrangement are located within the sensor device housing.

6. The smart bagging station of claim 1, further comprising:
a processor; and
a computer-readable medium storing a halo manager component that is operative upon execution by the processor to:
analyze sensor data from the plurality of sensor devices in accordance with a task-based hierarchy of preference, wherein analyzing the sensor data further comprises:
analyze a first type of the sensor data associated with a first type of sensor device in the plurality of sensor devices to identify the item;
analyze a second type of the sensor data associated with a second sensor device of a second type of sensor device in the plurality of sensor devices to identify the item in response to a failure to identify the item using the first type of sensor data; and
analyze a third type of sensor data associated with a third type of sensor device in the plurality of sensor device to identify the item in response to the failure to identify the item using the second type of sensor data.

7. The smart bagging station of claim 1, wherein the plurality of sensor devices further comprising:
a plurality of image capture devices generating real-time image data associated with the plurality of items within the detection zone;
a plurality of barcode readers generating barcode data associated with a selected item in the plurality of items passing through the scanning zone substantially above the bagging device;
a plurality of RFID tag readers generating the RFID tag data associated with the plurality of items within the detection zone; and
a plurality of weight sensors generating weight data, the plurality of weight sensors comprising a first weight sensor beneath the bagging device and a second weight sensor associated with a product scale.

8. A method for identifying items within a detection zone of a smart bagging station having a halo sensor array, the method comprising:
obtaining a first set of sensor data from a first set of sensor devices positioned in a curved arrangement within a recessed sensor device housing adjacent to a bagging device, the first set of sensor data comprising RFID tag data generated by a first RFID tag reader in the first set of sensor devices and barcode data associated with an item passing through a barcode scanning zone above the bagging device generated by a set of barcode readers located within the recessed sensor housing;
obtaining a second set of sensor data from a second set of sensor devices removably attached to a top portion of a vertical sensor device support member, wherein the second set of sensor devices are positioned above the bagging device, the second set of sensor devices comprising an image capture device generating images of items within the detection zone and a second RFID tag reader generating RFID tag data associated with items within the detection zone;
obtaining a third set of sensor data from a third set of sensor devices located below the bagging device, the third set of sensor devices comprising a weight sensor;
analyzing the first set of sensor data, the second set of sensor data and the third set of sensor data to identify an item placed into a storage container associated with the bagging device; and
storing an identification of the item placed into the storage container.

9. The method of claim 8, further comprising:
analyzing image data generated by a plurality of image capture devices using a machine learning (ML) computer vision (CV) model to identify a category of the item;
generating an abbreviated item pick list using the category of the item;
presenting the abbreviated item pick list via a user interface device;
generating a prompt requesting a user to identify the item from a list of possible items in the abbreviated item pick list;
surfacing the prompt via the user interface device; and
adding the item to a digital cart associated with the smart bagging station in response to receiving a selection of the identification of the item from the abbreviated item pick list.

10. The method of claim 8, further comprising:
analyzing sensor data from a plurality of sensor devices in accordance with a task-based hierarchy of preference, wherein analyzing the sensor data further comprises:
analyzing RFID tag data from at least one RFID tag reader in the plurality of sensor devices to identify the item;
analyzing digital watermark data obtained from scanning a digital watermark associated with the item to identify the item in response to a failure to identify the item using the RFID tag data;
analyzing universal product code (UPC) data obtained from reading a UPC by at least one barcode reader in the plurality of sensor devices to identify the item in response to a failure to identify the item using the digital watermark data;
analyze image data obtained from a plurality of image capture devices to identify the item in response to a failure to identify the item using the UPC data; and
analyze weight data associated with the item obtained from a weight sensor in response to a failure to identify the item using the image data.

11. The method of claim 8, wherein analyzing the sensor data further comprises:
analyzing image data obtained from a plurality of image capture devices to identify an item within the detection zone;
analyzing RFID tag data from at least one RFID tag reader in the plurality of sensor devices to identify the item in response to a failure to identify the item using the image data;
analyzing digital watermark data obtained from scanning a digital watermark associated with the item to identify the item in response to a failure to identify the item using the RFID tag data;
analyzing universal product code (UPC) data obtained from reading a UPC by at least one barcode reader in the plurality of sensor devices to identify the item in response to a failure to identify the item using the digital watermark data; and
analyzing weight data associated with the item obtained from a weight sensor in response to a failure to identify the item using the digital watermark data.

12. The method of claim 8, further comprising:
generating issue-specific feedback in response to failure to successfully add an item placed into the storage container to a digital cart associated with the smart bagging station, the issue-specific feedback comprising color-coded visual feedback, wherein a first color indicator is generated to indicate a first type of issue, and a second color indicator is generated to identify a second type of issue; and
presenting the issue-specific feedback via a user interface device.

13. The method of claim 8, further comprising:
generating issue-specific feedback in response to failure to successfully add an item placed into the storage container to a digital cart associated with the smart bagging station, the issue-specific feedback comprising audio feedback, wherein a first sound is generated to identify a failure to identify an item, a second sound is generated to identify an age restriction associated with the item, and a third sound is generated to identify a maximum quantity limit associated with the item.

14. A smart bagging apparatus with a halo array of sensor devices, the smart bagging apparatus comprising:
a bagging device comprising a bag support member for supporting a storage container;
a recessed sensor device housing adjacent to a back member of the bagging device;
a vertical sensor device support member adjacent to the bagging device; and
a plurality of sensor devices of a plurality of different sensor device types arranged in a halo configuration forming a detection zone around the bagging device, the detection zone comprising a threshold maximum sensor device range encompassing a bagging area associated with the smart bagging apparatus, wherein the plurality of sensor devices further comprises:
a first set of sensor devices positioned in a curved arrangement within the recessed sensor device housing, the first set of sensor devices generates sensor data associated with an item as the item passes through a scanning zone above the bagging device, the scanning zone comprising a threshold range of the first set of sensor devices;
a second set of sensor devices removably attached to a top portion of the vertical sensor device support member, wherein the second set of sensor devices are positioned above the bagging device, the second set of sensor devices comprising a first image capture device; and
a third set of sensor devices below the bagging device.

15. The smart bagging device of claim 14, wherein the first set of sensor devices further comprises:
a first radio frequency identifier (RFID) tag reader; and
a first barcode reader, the first RFID tag reader generating RFID tag data associated with an item as the item is placed into the storage container, and wherein the first barcode reader generates scan data associated with the item as the item passes through a barcode scanning zone above the bagging device.

16. The smart bagging device of claim 14, further comprising:
an RFID tag reader removably attached to a top portion of the vertical sensor device support member, the RFID tag reader generating RFID tag data associated with RFID tags within the detection zone.

17. The smart bagging apparatus of claim 14, wherein the first set of sensor devices further comprises:
a first UPC barcode reader at a first position of the curved arrangement, a second UPC barcode reader at a second position of the curved arrangement, a third UPC barcode reader at a third position, and a fourth UPC barcode reader in a fourth position of the curved arrangement within the recessed sensor device housing, wherein the first set of sensor devices form a semi-circle configuration of sensor devices.

18. The smart bagging apparatus of claim 14, wherein the plurality of sensor devices further comprises a plurality of image capture devices, the plurality of image capture devices comprising:
a first image capture device positioned above the bagging device, the first image capture device;
a second image capture device positioned below the bagging device; and
a third image capture device within the recessed sensor device housing, wherein the image data generated by the first image capture device, the second image capture device, and the third image capture device are used to detect and read digital watermarks associated with items passing through the detection zone.

19. The smart bagging apparatus of claim 14, further comprising:
a user interface device, wherein the user interface device presents issue-specific feedback to a user as the user places items into the storage container of the bagging device, the issue-specific feedback comprising color-coded visual feedback, wherein a first color indicator is generated to indicate a failure to identify a selected item passing through the detection zone and a second color indicator is generated to identify an age restriction associated with the selected item.

20. The smart bagging apparatus of claim 14, further comprising:
a user interface device, wherein the user interface device presents an abbreviated item pick list and prompts a user to identify a selected item placed on a produce scale from the abbreviated item pick list, wherein the abbreviated item pick list is a curated list of possible item identifications for the selected item based on image data of the item generated by the plurality of sensor devices, wherein the item is added to a digital cart associated with the smart bagging apparatus in response to receiving a selection of the identification of the item from the abbreviated pick list.

\* \* \* \* \*